United States Patent
Gupta et al.

(10) Patent No.: US 9,641,099 B2
(45) Date of Patent: May 2, 2017

(54) DC-AC INVERTER WITH SOFT SWITCHING

(71) Applicant: SPARQ SYSTEMS INC., Kingston (CA)

(72) Inventors: Vidisha Gupta, Lebanon, NH (US); Sayed Ali Khajehoddin, Edmonton (CA); Praveen K. Jain, Kingston (CA)

(73) Assignee: SPARQ SYSTEMS INC., Kingston, ON (CA)

( * ) Notice: Subject to any disclaimer, the term of this patent is extended or adjusted under 35 U.S.C. 154(b) by 238 days.

(21) Appl. No.: 14/205,650

(22) Filed: Mar. 12, 2014

(65) Prior Publication Data
US 2014/0268932 A1 Sep. 18, 2014

Related U.S. Application Data

(60) Provisional application No. 61/798,480, filed on Mar. 15, 2013.

(51) Int. Cl.
| | |
|---|---|
| *H02M 7/493* | (2007.01) |
| *H02M 7/5387* | (2007.01) |
| *H02M 7/48* | (2007.01) |

(52) U.S. Cl.
CPC ....... *H02M 7/493* (2013.01); *H02M 7/53871* (2013.01); *H02M 2007/4815* (2013.01); *Y02B 70/1441* (2013.01)

(58) Field of Classification Search
CPC . H02M 2007/4811; H02M 2007/4822; H02M 2007/4815; H02M 7/53; H02M 7/4526; H02M 7/44; H02M 7/493; H02M 1/14; H02M 1/08; H02M 2001/0058

USPC ........ 363/16, 17, 34, 39, 40, 41, 78, 79, 95, 363/97, 131–134; 136/244, 293, 252; 700/286–298; 323/906
See application file for complete search history.

(56) References Cited

U.S. PATENT DOCUMENTS

| | | | |
|---|---|---|---|
| 7,372,709 B2 * | 5/2008 | Mazumder | H02J 3/387 363/132 |
| 7,391,194 B2 * | 6/2008 | Brown | H02M 1/38 323/283 |

(Continued)

OTHER PUBLICATIONS

Search report from STIC EIC 2800 searcher Patel Samir.*

(Continued)

*Primary Examiner* — Timothy J Dole
*Assistant Examiner* — Htet Z Kyaw

(57) ABSTRACT

Provided are single phase and multiple phase DC-AC inverters with soft switching, and related methods and uses. The DC-AC inverters comprise at least one voltage source inverter circuit or at least one current source inverter circuit having a DC input and an AC output including a first component at a fundamental frequency and a ripple component at a frequency higher than the fundamental frequency; wherein the ripple component is of a sufficient magnitude that the voltage source inverter circuit output current reverses polarity and allows the at least one inverter circuit to operate with zero voltage switching; or wherein the ripple component is of a sufficient magnitude that the current source inverter circuit output voltage reverses polarity and allows the at least one inverter circuit to operate with zero current switching. The circuits and methods may be used with grid-connected renewable energy sources.

16 Claims, 23 Drawing Sheets

(56) References Cited

U.S. PATENT DOCUMENTS

| | | | | |
|---|---|---|---|---|
| 7,929,325 | B2* | 4/2011 | de Rooij | H02M 7/53871 363/71 |
| 8,212,408 | B2* | 7/2012 | Fishman | H02J 3/36 307/43 |
| 8,289,742 | B2* | 10/2012 | Adest | G01S 3/7861 363/71 |
| 8,670,249 | B2 | 3/2014 | Khajehoddin et al. | |
| 8,704,499 | B2* | 4/2014 | Escobar | G05F 1/67 323/222 |
| 8,773,873 | B2* | 7/2014 | Wagoner | H02M 7/4807 307/105 |
| 2006/0114623 | A1 | 6/2006 | Domoto | G01R 33/3852 361/18 |
| 2006/0221648 | A1* | 10/2006 | Liu | H02M 7/53871 363/17 |
| 2008/0084167 | A1* | 4/2008 | Waffenschmidt | H02M 3/337 315/210 |
| 2010/0097827 | A1* | 4/2010 | Ben-Yaakov | H05B 41/2886 363/65 |
| 2013/0343089 | A1* | 12/2013 | Gupta | H02M 7/4807 363/16 |
| 2015/0295497 | A1* | 10/2015 | Perreault | H02M 3/3376 363/21.03 |

OTHER PUBLICATIONS

Klaassens, J. Ben; , "DC-AC Series-Resonant Converter System with High Internal Frequency Generating Multiphase AC Waveforms for Multikilowatt Power Levels," Power Electronics, IEEE Transactions on , vol. PE-2, No. 3, pp. 247-256, Jul. 1987.

Sul, S.K.; Lipo, T.A.; , "Design and performance of a high-frequency link induction motor drive operating at unity power factor," Industry Applications, IEEE Transactions on , vol. 26, No. 3, pp. 434-440, May/Jun. 1990.

Murai, Y.; Lipo, T.A.; , "High-frequency series-resonant DC link power conversion," Industry Applications, IEEE Transactions on , vol. 28, No. 6, pp. 1277-1285, Nov./Dec. 1992.

He, J.; Mohan, N.; Wold, B.; , "Zero-voltage-switching PWM inverter for high-frequency DC-AC power conversion," Industry Applications, IEEE Transactions on , vol. 29, No. 5, pp. 959-968, Sep./Oct. 1993.

Divan, D.M.; , "The resonant DC link converter—a new concept in static power conversion," Industry Applications, IEEE Transactions on , vol. 25, No. 2, pp. 317-325, Mar./Apr. 1989.

Yong Li; Lee, F.C.; Boroyevich, D.; , "A three-phase soft-transition inverter with a novel control strategy for zero-current and near zero-voltage switching," Power Electronics, IEEE Transactions on , vol. 16, No. 5, pp. 710-723, Sep. 2001.

Yong Li; Lee, F.C.; , "Design considerations for a 50-kW soft-transition inverter with zero-current and near-zero-voltage switching," Applied Power Electronics Conference and Exposition, 2001. APEC 2001. Sixteenth Annual IEEE , vol. 2, No., pp. 931-937 vol. 2, 2001.

Jih-Sheng Lai; , "Resonant snubber based soft-switching inverters for electric propulsion drives," Industrial Electronics, Control, and Instrumentation, 1996., Proceedings of the 1996 IEEE IECON 22nd International Conference on , vol. 1, No., pp. 47-52 vol. 1, Aug. 5-10, 1996.

V. Vlatkovic, D. Borojevic, F. Lee, C. Cuadros and S. Gataric, "A new zero-voltage transition, three-phase PWM rectifier/inverter circuit", Power Electronics Specialists Conference, 1993. PESC '93 Record., 24th Annual IEEE, 1993, pp. 868-873.

"Cascaded Multilevel Converters and Their Applications in Photovoltaic Systems" Sayed Ali Khajehoddin, Praveen Jain, Alireza Bakhshai. 2nd Canadian Solar Buildings Conference, Calgary, Jun. 10-14, 2007.

D.M. Divan and G. Skibinski, "Zero-switching-loss inverters for high-power applications," IEEE Transactions on Industry Applications, vol. 25, pp. 634-643, 1989.

G. Venkataramanan and D.M. Divan, "Pulse width modulation with resonant DC link converters" Industry Applications Society Annual Meeting, 1990. Conference Record of the 1990 IEEE, 1990 pp. 984-990, vol. 2.

Shaotang Chen and T.A. Lipo, "Soft-switched inverter for electric vehicle drives", Applied Power Electronics Conference and Exposition, 1995. APEC '95 Conference Proceedings 1995, Tenth Annual, 1995, pp. 586-591, vol. 2.

* cited by examiner

DC-AC INVERTER WITH SOFT SWITCHING

RELATED APPLICATION

This application claims the benefit of the filing date of U.S. Provisional Patent Application No. 61/798,480, filed on 15 Mar. 2013, the contents of which are incorporated herein by reference in their entirety.

FIELD

This invention relates to DC/AC inverters with soft switching.

BACKGROUND

Power switches in many DC/AC inverter designs are hard switched, which generates EMI noise and losses in the inverter. A low switching frequency may be used to increase the inverter efficiency, however, this imposes a compromise in the size of the inverter components.

Electricity produced by power generators such as photovoltaic (PV) installations is becoming increasingly promising as a source of renewable energy. Maximizing efficiency of such systems is critical to their widespread utility. One route to improving efficiency of such systems is through improving inverter design, and much attention has been focused on implementation of micro-inverters; that is, inverters associated with individual power generators such as individual PV panels. Conventional approaches to improving efficiency, such as use of a low switching frequency, may not be suitable for micro-inverter applications.

SUMMARY

Provided is a DC-AC inverter, comprising: at least one voltage source inverter circuit or at least one current source inverter circuit having a DC input and an AC output including a first component at a fundamental frequency and a ripple component at a frequency higher than the fundamental frequency; wherein the ripple component is of a sufficient magnitude that the voltage source inverter circuit output current reverses polarity and allows the at least one inverter circuit to operate with zero voltage switching; or wherein the ripple component is of a sufficient magnitude that the current source inverter circuit output voltage reverses polarity and allows the at least one inverter circuit to operate with zero current switching.

One embodiment further comprises a cancellation circuit that substantially maintains the ripple component at the inverter circuit output and substantially prevents the ripple component from being delivered to a load. The cancellation circuit may comprise a n-order filter, wherein n is 2 or more. In one embodiment the cancellation circuit comprises a 3rd-order filter.

In one embodiment the DC-AC inverter is a voltage source inverter, and the cancellation circuit comprises one or more additional voltage source inverter circuits, each voltage source inverter circuit providing an AC output including a first component at a fundamental frequency and a ripple component at a frequency higher than the fundamental frequency; wherein outputs of each voltage source inverter circuit are connected in parallel.

In another embodiment the DC-AC is a current source inverter, and the cancellation circuit comprises one or more additional current source inverter circuits, each current source inverter circuit providing an AC output including a first component at a fundamental frequency and a ripple component at a frequency higher than the fundamental frequency; wherein outputs of each current source inverter circuit are connected in parallel or series.

In these embodiments, soft switching may be provided by variable dead time control of switches in the at least one voltage source inverter circuit or in the at least one current source inverter circuit.

In certain embodiments, outputs of the voltage source inverter circuits or current source inverter circuits may be phase shifted by an amount selected to substantially prevent the ripple component from being delivered to the load.

In these embodiments, the DC input is provided by a renewable energy source. The DC input may be provided by a photovoltaic source. The load may be a power distribution grid.

Also provided is a photovoltaic module comprising a DC-AC inverter as described herein.

Also provided is a power generation system, comprising: a DC-AC inverter as described herein, wherein the load is a power distribution grid; and a power generator that provides the DC to the inverter circuit.

Also provided is a DC-AC inverter method, comprising: operating at least one voltage source inverter circuit or at least one current source inverter circuit such that an AC output includes a first component at a fundamental frequency and a ripple component at a frequency higher than the fundamental frequency; wherein the ripple component is of a sufficient magnitude that (i) the voltage source inverter circuit output current reverses polarity; or (ii) the current source inverter circuit output voltage reverses polarity; and using the ripple component to operate the at least one voltage source inverter circuit with zero voltage switching; or using the ripple component to operate the at least one current source inverter circuit with zero current switching.

The method may further comprise substantially maintaining the ripple component at the inverter circuit output and substantially preventing the ripple component from being delivered to a load. The method may further comprise using a n-order filter, wherein n is 2 or more. The method may further comprise using a 3rd-order filter.

In an embodiment wherein the DC-AC inverter is a voltage source inverter, the method may further comprise providing one or more additional voltage source inverter circuits; operating each voltage source inverter circuit such that an AC output includes a first component at a fundamental frequency and a ripple component at a frequency higher than the fundamental frequency; and connecting outputs of each voltage source inverter circuit together in parallel.

In an embodiment wherein the DC-AC inverter is a current source inverter, the method may further comprise providing one or more additional current source inverter circuits; operating each current source inverter circuit such that an AC output includes a first component at a fundamental frequency and a ripple component at a frequency higher than the fundamental frequency; and connecting outputs of each current source inverter circuit together in parallel or series.

The method may further comprise using variable dead time control to implement soft switching of switches in the at least one voltage source inverter circuit or in the at least one current source inverter circuit.

The method may include phase shifting outputs of the voltage source inverter circuits or the current source inverter circuits by an amount selected to substantially prevent the ripple component from being delivered to the load.

The method may comprise connecting a DC input of the DC-AC inverter to a renewable energy source, such as a photovoltaic source.

The method may comprise connecting an output of the DC-AC inverter to a power distribution grid.

BRIEF DESCRIPTION OF THE DRAWINGS

For a greater understanding of the invention and to show how it may be carried into effect, embodiments are described below, by way of example, with reference to the accompanying drawings, wherein.

DETAILED DESCRIPTION OF EMBODIMENTS

The circuits and methods provided herein include single phase and multiple phase DC/AC inverters in which soft switching is implemented. By implementing soft switching, i.e., zero voltage switching or zero current switching, switching losses are minimized and efficiency is improved. Adaptive variable dead-time is used to provide soft switching under all operating conditions. Since soft switching as described is based on control algorithms, no auxiliary circuits are required for implementation, and hence there is substantially no increase in cost, component count, or size associated with implementation.

Embodiments are described herein primarily with respect to full-bridge inverter topology. However, implementation in other inverter topologies is contemplated herein, and those of ordinary skill in the art will readily understand how to implement the described embodiments in other inverter topologies. Further, embodiments are described herein primarily with respect to voltage source inverter topologies. However, implementation in current source inverter topologies is contemplated herein. Those of ordinary skill in the art will readily understand how to implement the described embodiments in current source inverter topologies.

Figure 1A:
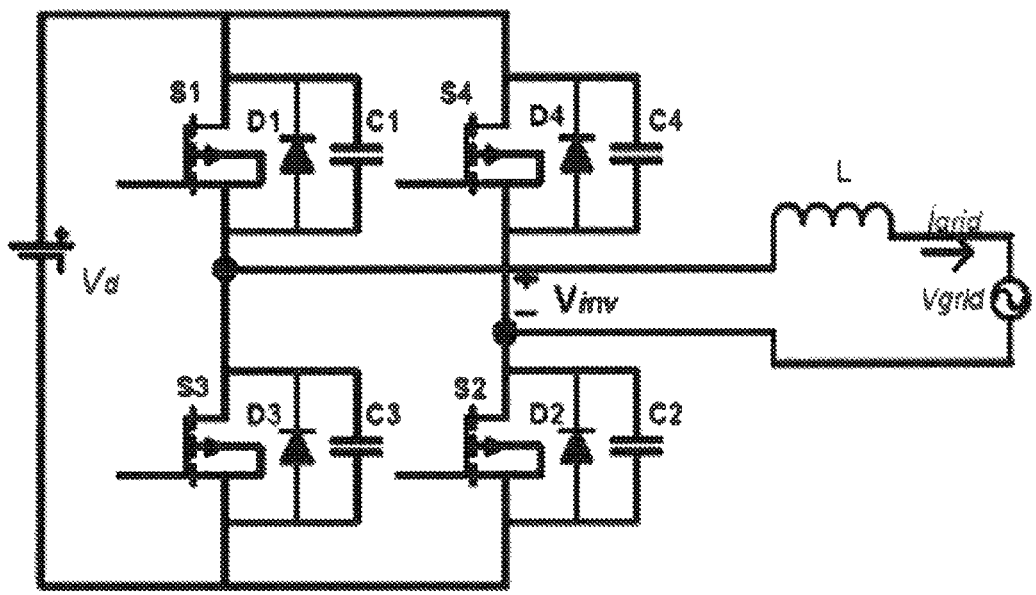
FIGS. 1A and 1B are schematic diagrams of a conventional full-bridge inverters.
Figure 1B:
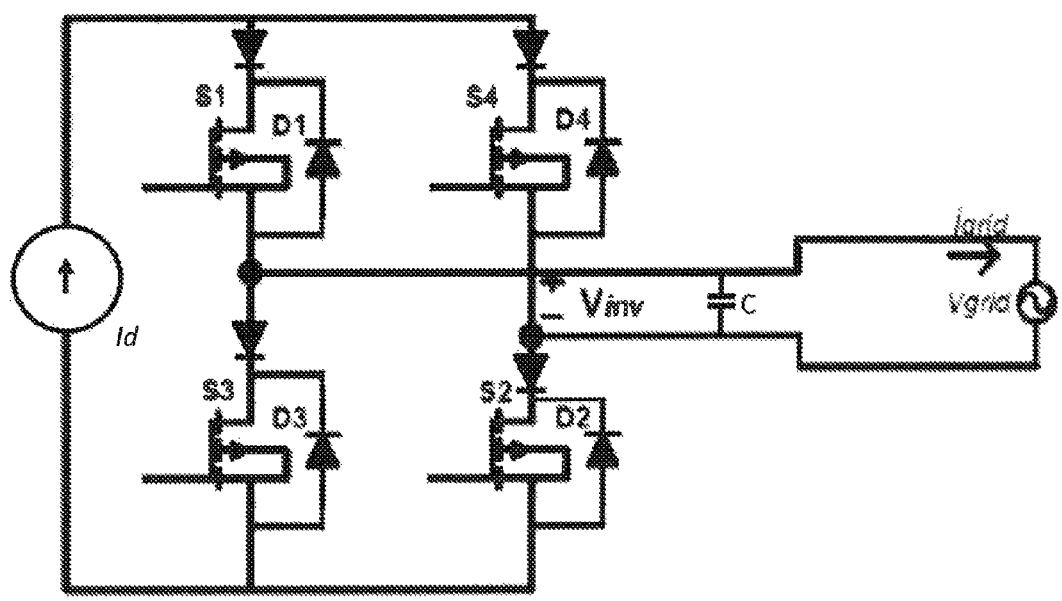

An exemplary conventional full-bridge voltage source inverter circuit is shown in FIG. 1A, and includes a DC source Vd, switches S1-S4, each shown with their body diodes D1-D4 and drain-source capacitors C1-C4, output inductor L, and load, in this example a power distribution grid. An exemplary conventional full-bridge current source inverter circuit is shown in FIG. 1B, and includes a DC source Id, switches S1-S4, each shown with their body diodes D1-D4, output capacitor C, and load, in this example a power distribution grid.

Inverter circuit and method embodiments provide a large current ripple at the inverter output, such that the inverter output current changes its polarity, thereby enabling the inverter to operate with soft switching. However, because of the large current ripple at the inverter output, the embodiments include passive or active features that reduce or substantially eliminate ripple in the current supplied to the load. For example, where the load is a power distribution grid, the passive or active features that reduce or substantially eliminate ripple ensure that the current is suitable for delivery to the grid, for example, by satisfying standards for limits for harmonics and total harmonic distortion (THD) of current supplied to the grid. Passive features that reduce or substantially eliminate ripple in the current supplied to the load include an output filter, as provided in single phase inverter embodiments. Active features that reduce or substantially eliminate ripple in the current supplied to the load include connecting a number (n) of inverter modules together in a parallel arrangement, in multiple phase inverter embodiments.

Figure 2A:
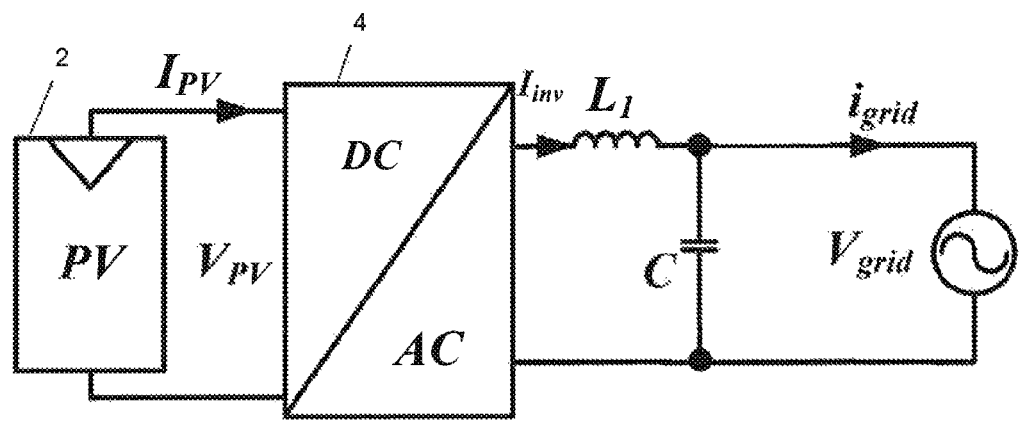
FIG. 2A is a simplified schematic diagram of an embodiment of a single phase inverter with a $2^{nd}$ order output filter, wherein the application is a grid-connected PV panel.
Figure 2B:
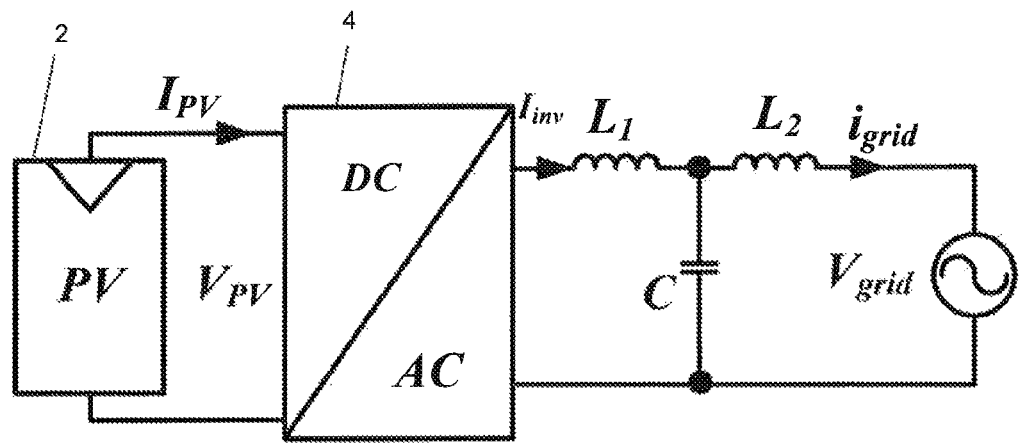
FIG. 2B is a simplified schematic diagram of an embodiment of a single phase inverter with a $3^{rd}$ order output filter, wherein the application is a grid-connected PV panel.
Figure 2C:
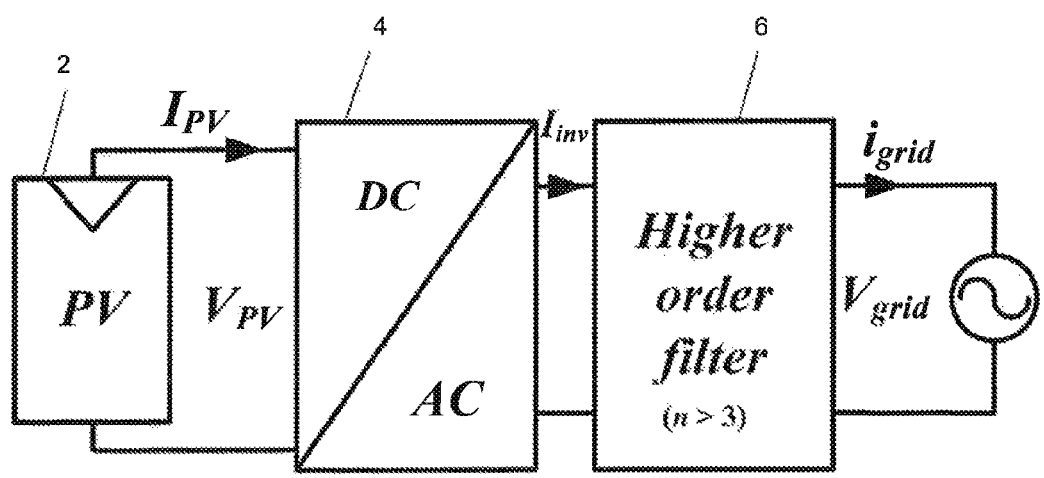
FIG. 2C is a simplified diagram of an embodiment of a single phase inverter with a higher order output filter, wherein the application is a grid-connected PV panel.

Examples of single phase inverter embodiments of the invention are shown in FIGS. 2A, 2B and 2C. In these embodiments, a power generator 2, for example a photovoltaic (PV) generator, produces a current $I_{PV}$ that is fed to a DC/AC circuit 4. As described above, the output current $I_{inv}$ of the DC/AC circuit 4 includes a large current ripple, such that the output inverter current changes its polarity, thereby enabling the inverter to operate with zero voltage switching. The embodiment of FIG. 2A includes a $2^{nd}$ order output filter $L_1$, C, the embodiment of FIG. 2B includes a $3^{rd}$ order output filter $L_1$, C, $L_2$, whereas the embodiment of FIG. 2C includes a higher order output filter 6. The output filters passively reduce or substantially eliminate ripple in the current $I_{grid}$ supplied to the load, in this case a power distribution grid.

Referring to FIG. 2A or 2B, $L_1$ is selected so that the current $I_{inv}$ has enough ripple for the worst case scenario, i.e., operation at full output power with sufficient ripple to ensure that the current changes polarity. Full power is worst case because the peak of the fundamental component of the output current can be too large so that the current with the ripple does not reach zero and does not change its polarity. That is, if the peak magnitude of the current (i.e., the peak of the sine wave) is too large, the peak to peak ripple at that instant may not cross zero and hence there will be no change in polarity. This approach may be used for any other output filter design, as shown generally in FIG. 2C, provided that the polarity of $I_{inv}$ changes every switching cycle for all operating conditions. This ensures zero voltage switching in the inverter circuit. The resulting ripple in the inverter output current $I_{inv}$ is higher than that provided by conventional designs. This ripple, which may be at one or more harmonic of the grid frequency, is reduced or substantially eliminated by appropriate selection of output filter elements, e.g., C and $L_2$ in the embodiment of FIG. 2B, or elements in a higher order filter as in FIG. 2C, according to methods well-known in the art. Inductor $L_1$ is selected such that the output current ripple level is maintained at the desired value to guarantee soft switching.

Figure 3A:
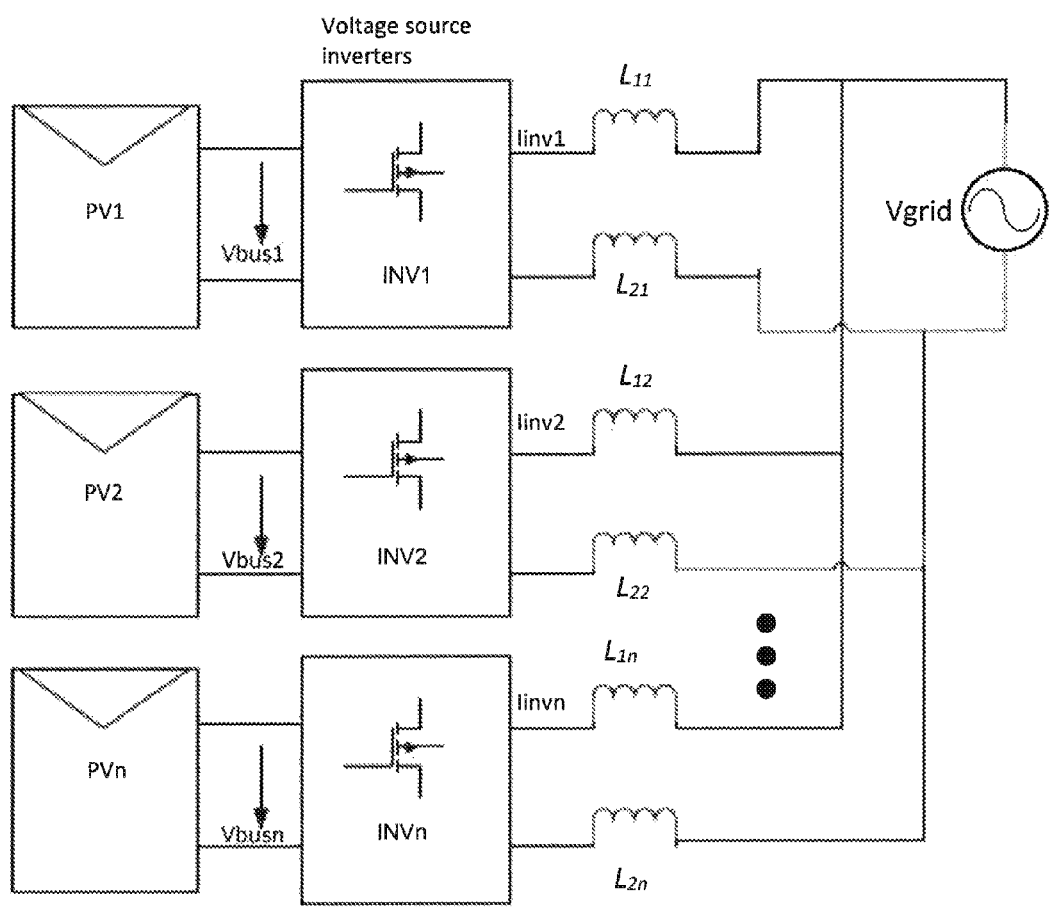
FIGS. 3A and 3C are block diagrams of multiple phase voltage source inverter embodiments wherein the application is a grid-connected PV system.
Figure 3B:
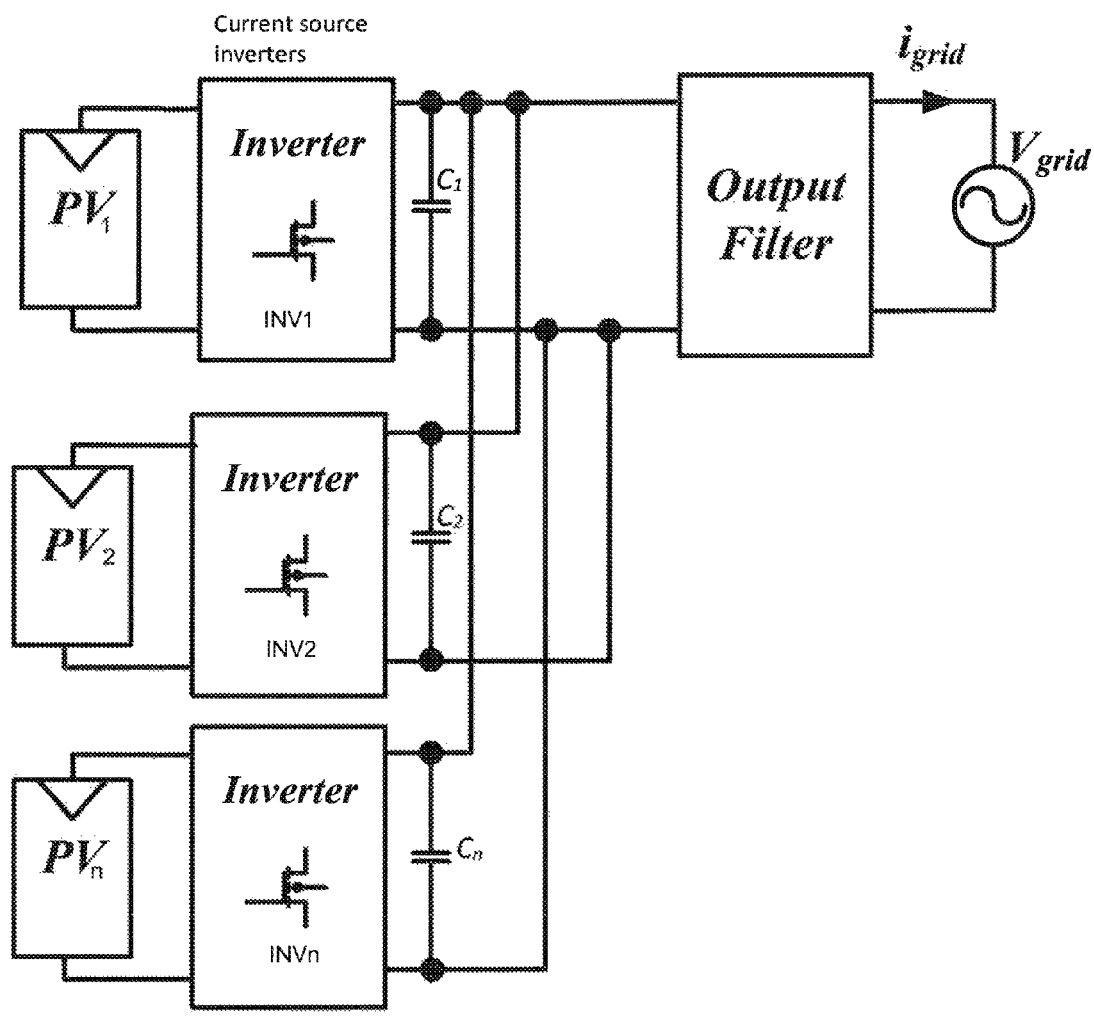
FIGS. 3B and 3D are block diagrams of multiple phase current source inverter embodiments wherein the application is a grid-connected PV system.
Figure 3C:
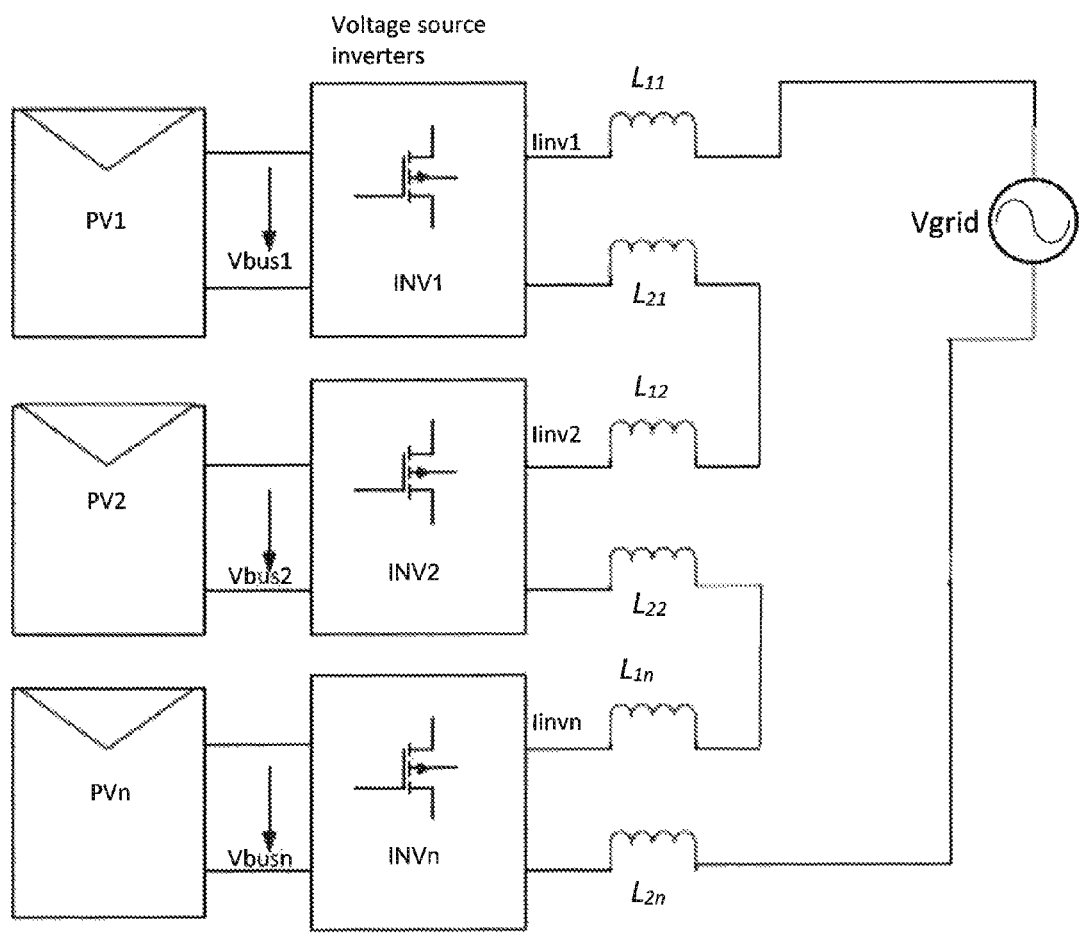
Figure 3D:
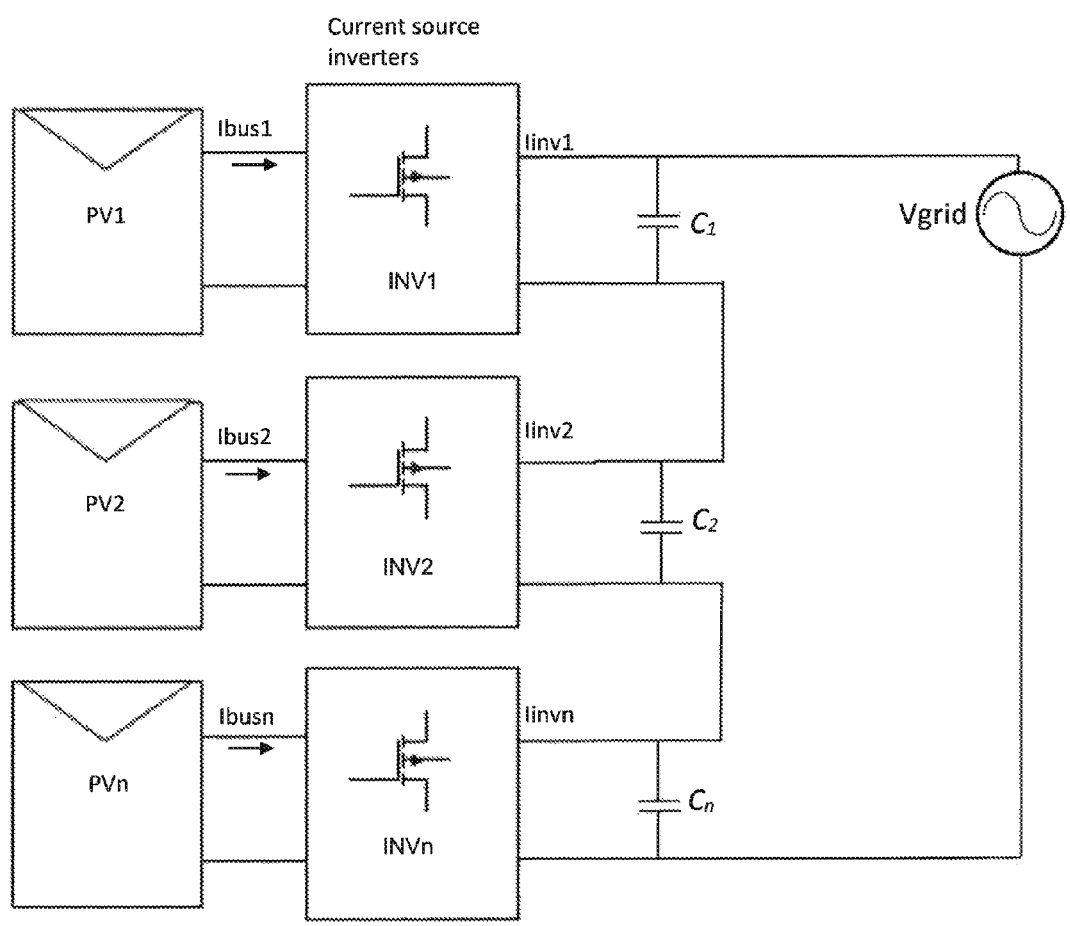

Embodiments of generalized multiple phase voltage source inverters are shown in FIGS. 3A and 3C, and multiple phase current source inverters are shown in FIGS. 3B and 3D, as applied to a PV systems. In the embodiment of FIG. 3A, n parallel-connected voltage source inverter module outputs supply power to the utility grid, whereas in the embodiment of FIG. 3B, n parallel-connected current source inverter module outputs supply power to the utility grid. The embodiment of FIG. 3C shows n series-connected voltage source inverters, and FIG. 3D shows a multiple phase current source inverter with n series-connected current source inverters. In FIGS. 3A to 3D, PV1, PV2, and PVn are the PV panels, and INV1, INV2, and INVn are the inverter modules.

In the embodiment of FIG. 3A, there are two output inductors for each inverter module, designated $L_{1n}$ and $L_{2n}$ where n indicates the inverter module to which the inductors belong. In some embodiments other configurations of output filter elements may be used. For example, there may be only a single output inductor for each inverter module. In other embodiments of FIGS. 3A to 3D, an additional output filter, for example, a higher order output filter, may be connected to the combined output of the n inverter modules. See, for example, FIG. 3B.

Referring to the embodiment of FIG. 3A, each inverter module includes features as described in respect of the embodiments of FIG. 2A, 2B, or 2C; that is, the output currents $I_{inv1}$, $I_{inv2}$, $I_{invn}$ of the inverter modules include a large current ripple, such that each inverter output current changes polarity, thereby enabling each inverter INV1, INV2, INVn to operate with zero voltage switching. Similarly, the inverter modules of the embodiments of FIGS. 3B to 3D include features such that each inverter module operates with soft switching.

In multiple phase embodiments, the minimum number of inverter modules may be as few as two, and the maximum may be determined as a function of the required output power. Although there is no theoretical limit on the maximum number of inverter modules that may be employed, a practical limit, based on cost or on the need to synchronize the modules, may be 20 or 30 modules. As used herein, the term "inverter module" refers to a single inverter circuit, such as a single full-bridge or a single half-bridge inverter. Multiple phase embodiments may also be referred to herein as "interleaved" embodiments.

In multiple phase embodiments, the size of the output filter may be reduced, relative to conventional designs, without increasing the switching frequency. Interleaving improves the quality (e.g., reduces output current harmonics and THD) of the current fed to the load. This is of particular relevance in applications where the inverter output is connected to the utility grid. Such applications may include, for example, inverters used in power generation applications, such as with photovoltaic (PV), wind turbine, fuel cell, and the like, also referred to as distributed generation systems. However, whereas inverters as described herein may be well-suited to such applications, they are not limited thereto and may be used in any application wherein DC/AC conversion is required.

Thus, as described above, enhanced inverter performance, including improved efficiency, may be obtained by applying soft switching and adaptive variable dead-time control to a single inverter module or to a number n of inverter modules, wherein the outputs of the n inverter modules are connected to a load.

Principle of Operation

The inverter, or the inverter modules of a multiple phase inverter, may be controlled by a pulse width modulation (PWM) strategy, such as, e.g., unipolar pulse width modulation (UPWM), bipolar pulse width modulation, or selective harmonic cancellation, using modulating signals. In a multiple phase inverter, control includes carrier signals phase-shifted by $\theta=\pi/n$. The modulating signals for each inverter module may be substantially identical.

Figure 4:
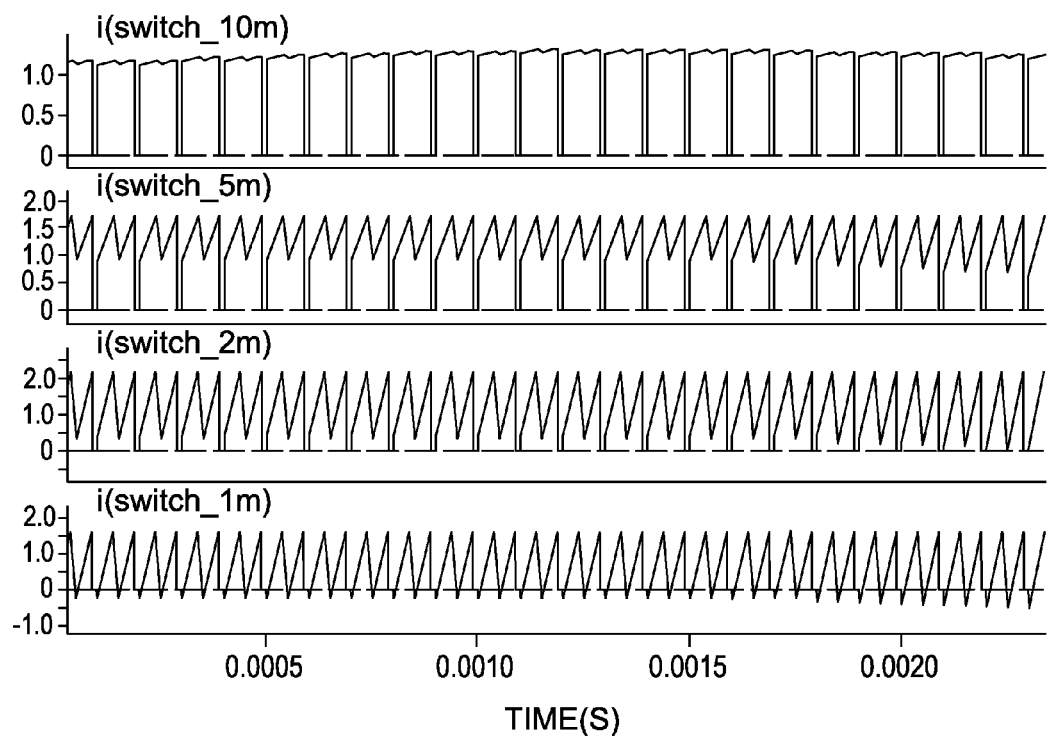
FIG. 4 is a plot showing the effect of output inductance L on switching ripple in a full-bridge inverter module, wherein L=10 mH (top), L=5 mH ($2^{nd}$ from top), L=2 mH ($3^{rd}$ from top), and L=1 mH (bottom)
Figure 5:
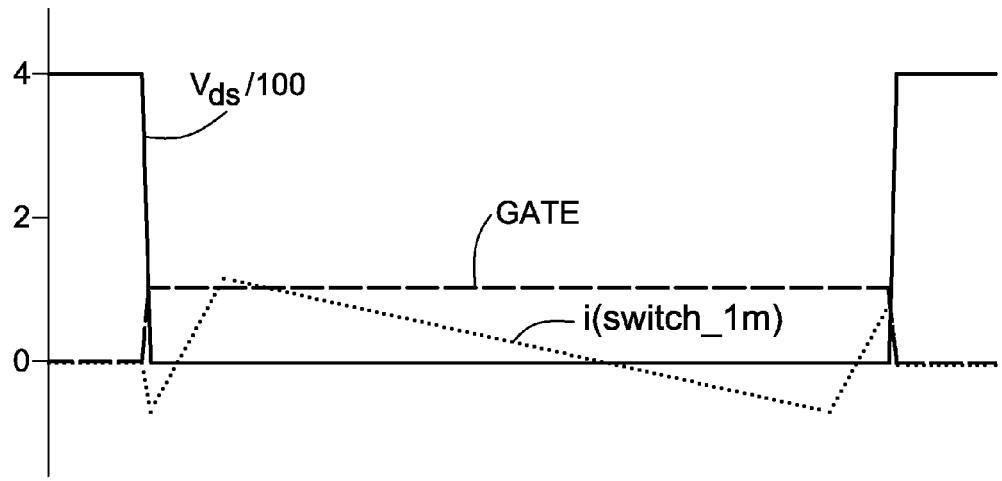
FIG. 5 is a generalized plot showing zero voltage switching at turn on of a power switch of an inverter module.

Each inverter switch (e.g., MOSFET) is operated such that the switching ripple in the inductor current is large enough to cause the polarity of the inductor current to reverse. As a result, the body diode of the switch conducts the reverse current and produces a diode voltage drop (e.g., 0.7 V). Accordingly, the switch turns on at substantially zero voltage. The effect of output inductance L on the switching ripple in the switch current is shown in FIG. 4 for four values of L. At a particular value of the output inductance (e.g., 1 mH in FIG. 4), the ripple is large enough to cross 0 V and to create a soft switching condition at switch turn on, as shown in FIG. 5. As a result of soft switching at switch turn-on, switching losses are minimized.

In accordance with multiphase embodiments described herein, since the outputs of the inverter modules are connected together in parallel, the total output current is the sum of the currents of the individual modules. For best results, the number n of inverter modules is selected to ensure soft switching at substantially every switching period of the inverter module switches, including the zero crossings of the current (at line frequency, e.g., 50 Hz or 60 Hz). The ripple content and the harmonic cancellation in the current fed to the load (e.g., the grid) by the n inverter modules are regulated by controlling the phase shifts θ between carrier signals delivered to each inverter module from a controller. An advantage of such embodiments is that parallel or series connection of the inverter module outputs to construct the total output current allows the size of the inverter output filter to be reduced. For example, the size of the output filter may be reduced to one-tenth of the size required by inverters based on conventional techniques.

By controlling phase-shifts θ between carrier signals, the n inverter modules generate n non-repetitive output current patterns that, upon addition through connection of the inverter module outputs, produce a high-quality current waveform. This results from the effective switching frequency being n times higher than the actual frequency of switching and harmonic cancellation, due to the phase-shift in the carrier signals of the inverter modules. To realize a total output power P using n inverter modules and an effective switching frequency of $f_{sw,eff}$, the contribution of each inverter will be P/n and the actual switching frequency will be $f_{sw}=f_{sw,eff}/n$.

Figure 6:
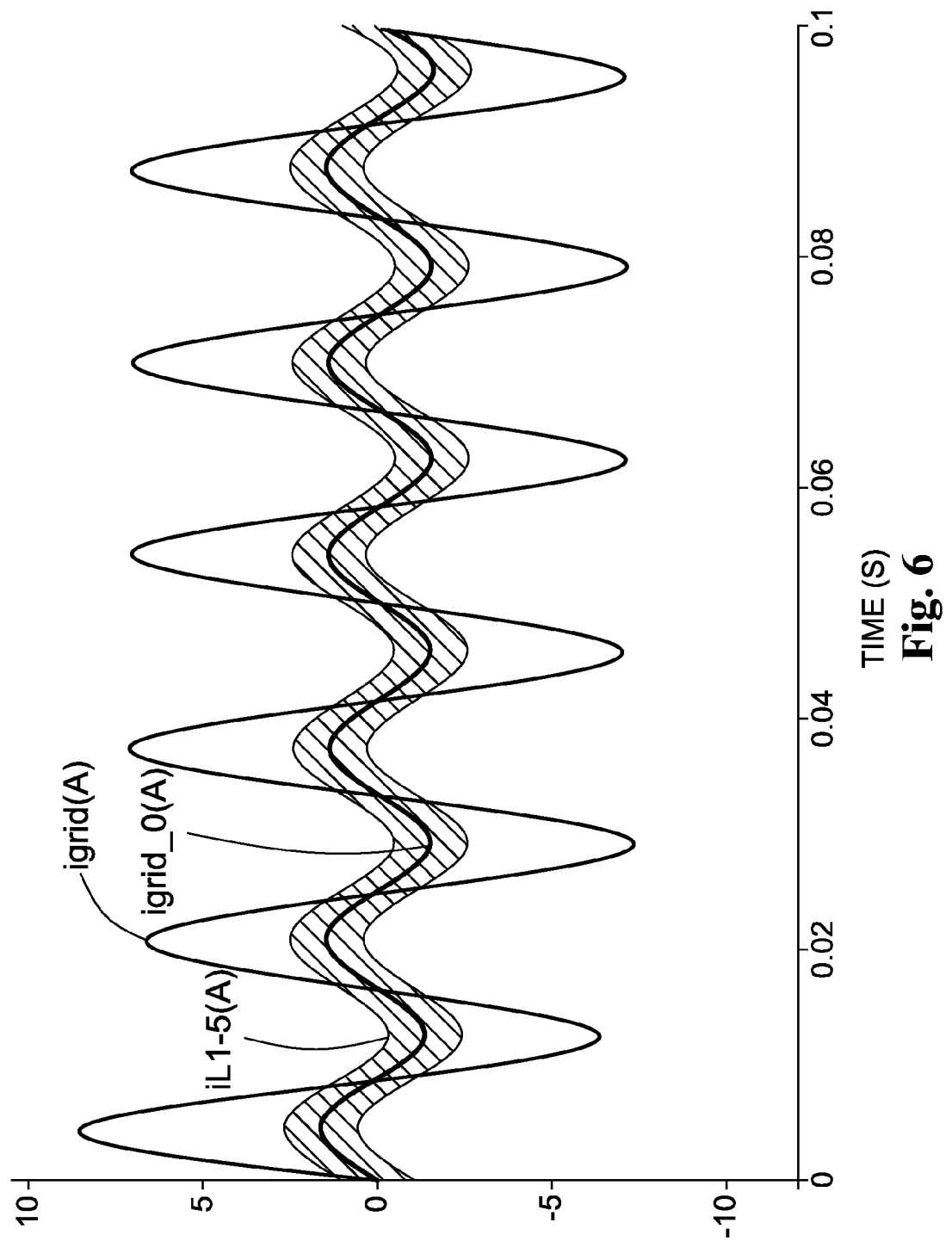
FIG. 6 is a plot showing simulation results of output current ripple for a single inverter ($i_{grid\_0}$) and for a phase staggered multiple phase inverter including five inverter modules, wherein $i_{grid}$ is the output current when $i_{L1-5}$ are the output inductor currents of parallel inverter modules 1-5, respectively.
Figure 7:
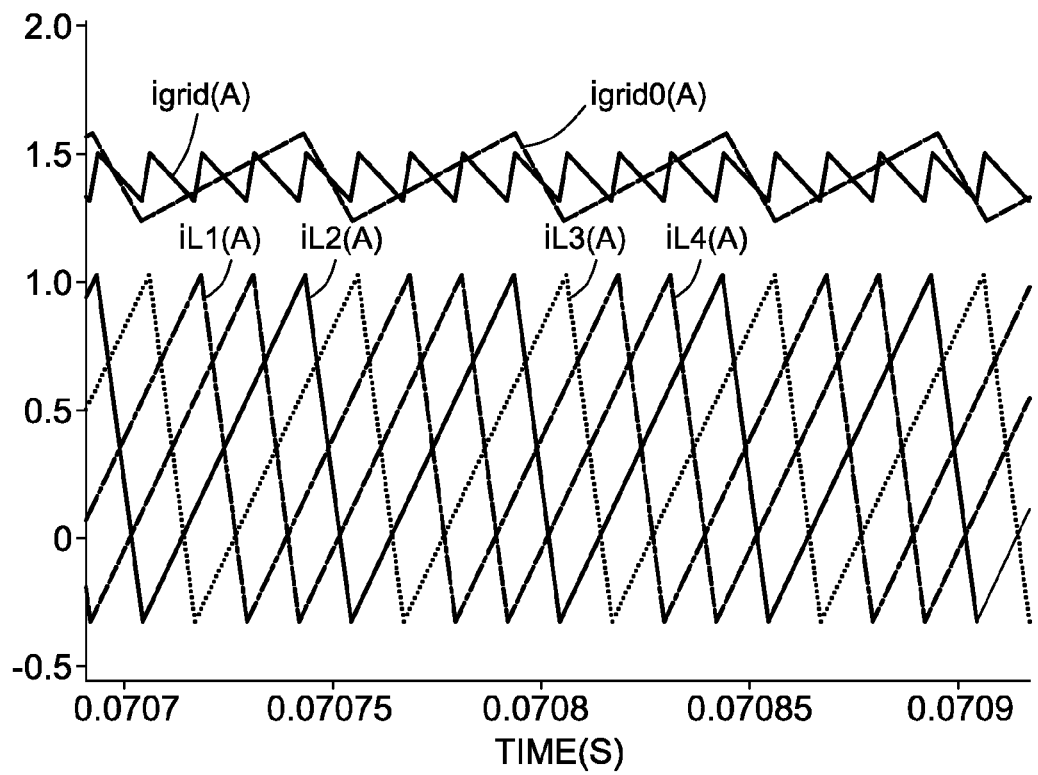
FIG. 7 is a plot showing simulation results of output current ripple for a single inverter ($i_{\_grid(0)}$) and for a phase staggered multiple phase inverter including four inverter modules, wherein $i_{grid}$ is the output current when $i_{L1}$-$i_{L4}$ are the output inductor currents of parallel inverter modules 1-4, respectively.
Figure 8:
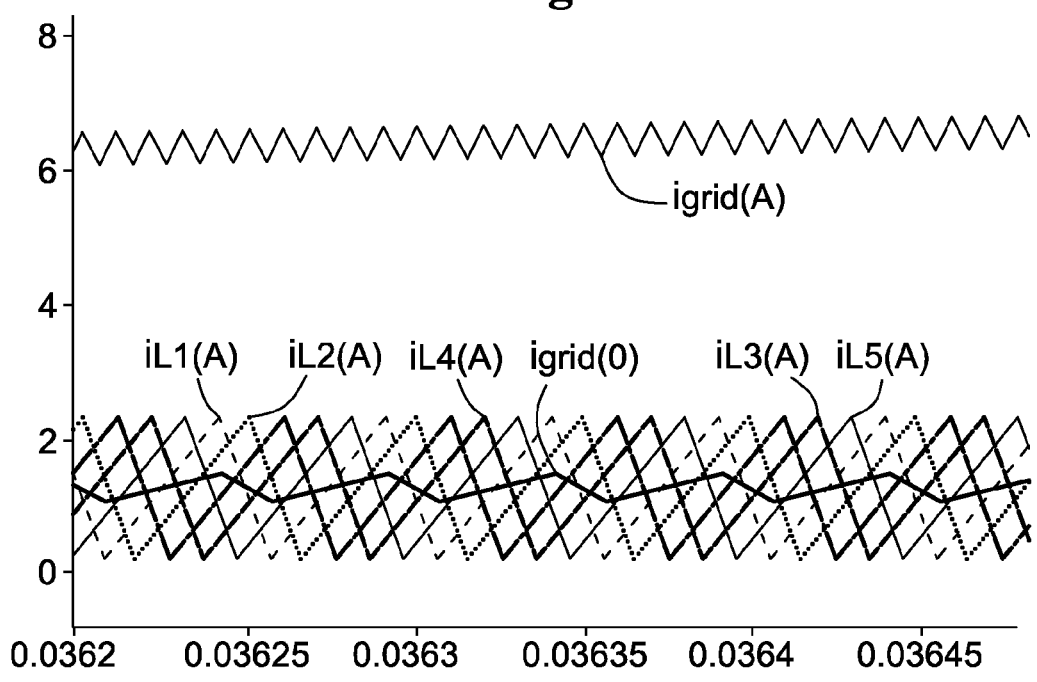
FIG. 8 is a plot showing simulation results of output current ripple for a single inverter ($i_{\_grid(0)}$) and for a phase staggered multiple phase inverter including four inverter modules, wherein $i_{grid}$ is the output current when $i_{L1}$-$i_{L5}$ are the output inductor currents of parallel inverter modules 1-5, respectively.

The ripple in the sum of the output currents of the n inverter modules is reduced by a factor of n. For example, comparison of the inductor current waveform of one module and that of the sum of the inductor currents of five modules is shown in FIG. 6. Here, $i_{grid\_0}$ represents the output (e.g., grid) current when no interleaving is implemented, and $i_{grid}$ is the current fed to the grid when $i_{L1-5}$ are the output inductor currents of parallel inverter modules 1-5, respectively. Simulation results for four parallel inverters and for five parallel inverters are shown zoomed-in in FIGS. 7 and 8, respectively, to verify the selection of phase shift angle θ for even and odd numbers of parallel inverter modules.

To further reduce switching losses, soft switching at switch turn off may be implemented. For example, a snubber capacitor may be used to further reduce switching losses by providing substantially zero voltage at turn off. In the presence of the snubber capacitor, the switch current decreases with a constant di/dt and the rise of voltage to the input DC voltage Vd is slowed down. With a fixed dead time, the switch may not achieve zero voltage switching under some conditions because the current might not be great enough to discharge the snubber capacitor. From a reliability viewpoint, a long dead time assures that overlapping of the upper and lower switch gate drive signals in a leg of the bridge (i.e., in the case of a full-bridge inverter) will not occur; however, during the dead-time, the current must continue to flow through the body diode of a lower switch of a leg of the bridge (i.e., S2 or S3 in FIG. 1A) when it is turned off. Since this switch has a higher voltage drop, this situation results in higher power dissipation compared to the resistive power dissipation when the switch is on.

Figure 9A:
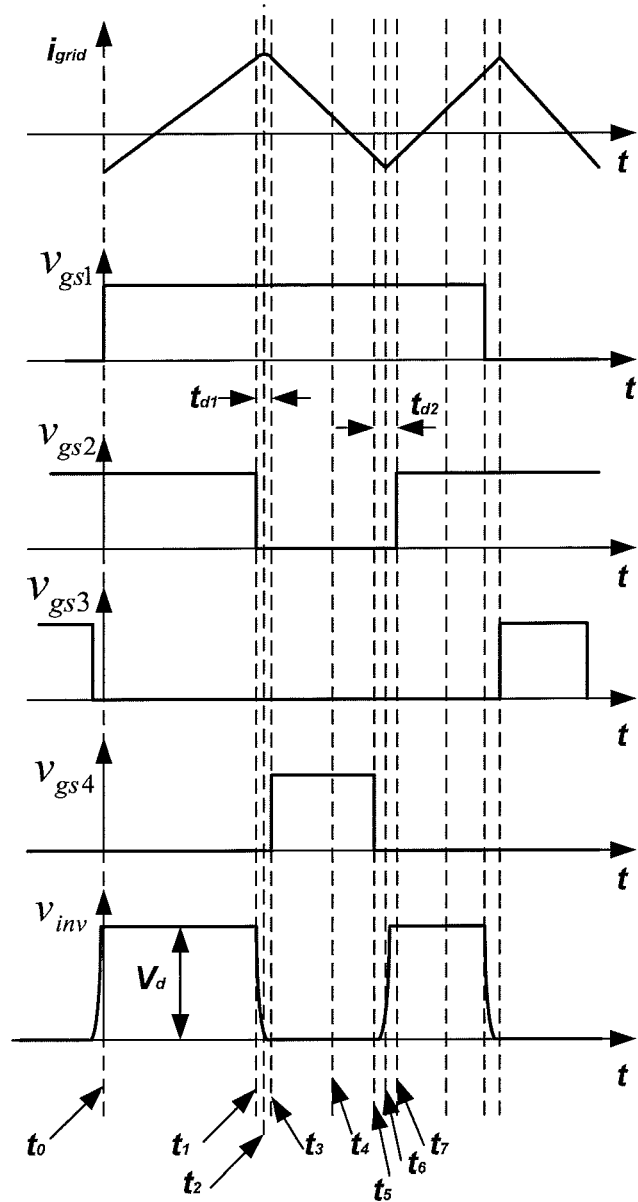
FIG. 9A is a plot showing operation waveforms of a soft-switched inverter, according to one embodiment.
Figure 9B:
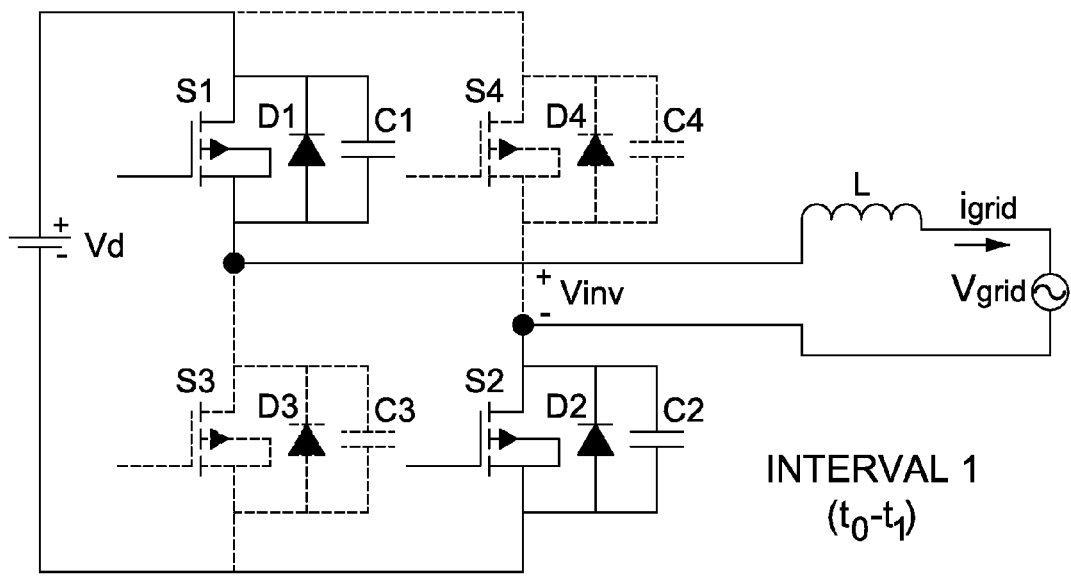
FIGS. 9B-9H are diagrams showing different states of an inverter circuit during soft switching, according to one embodiment.
Figure 9C:
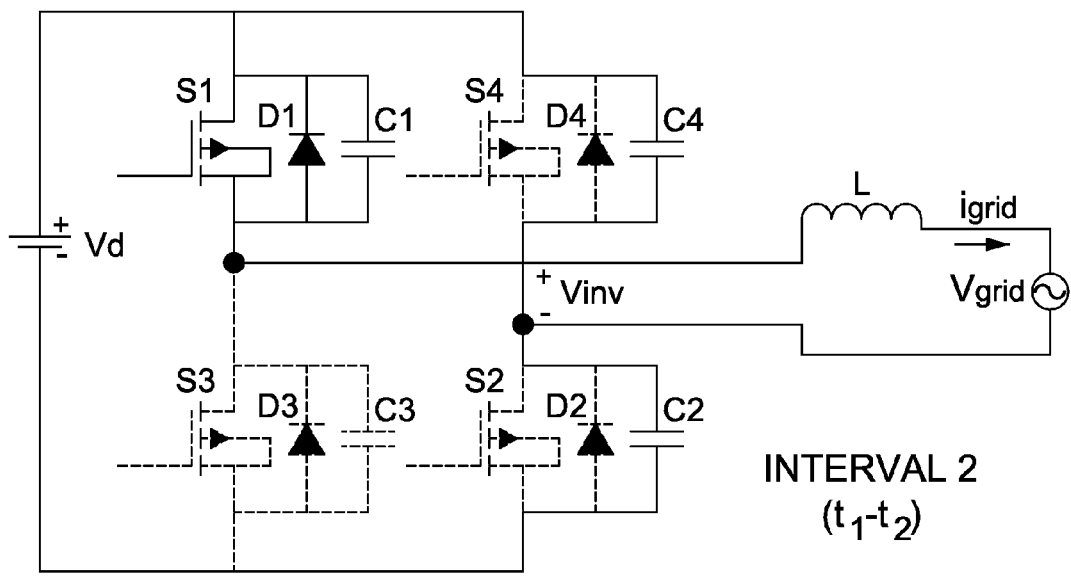
Figure 9D:
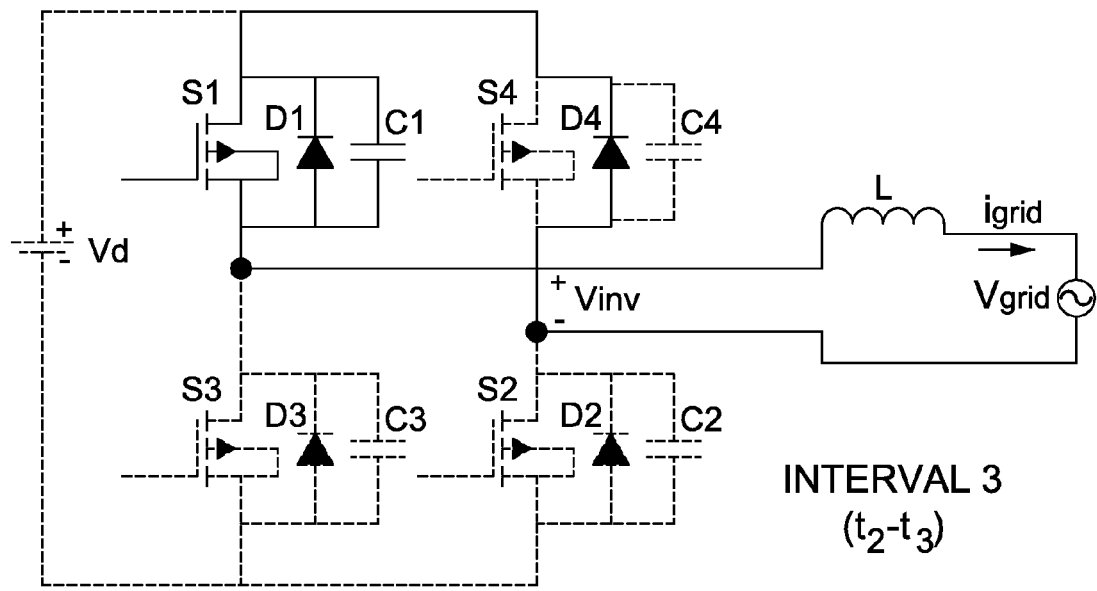
Figure 9E:
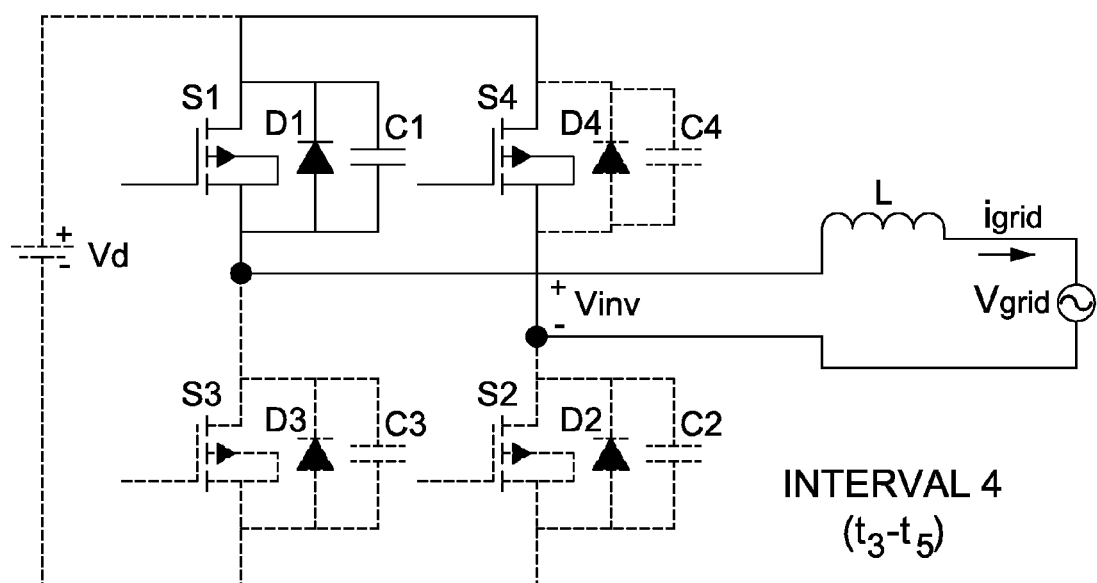
Figure 9F:
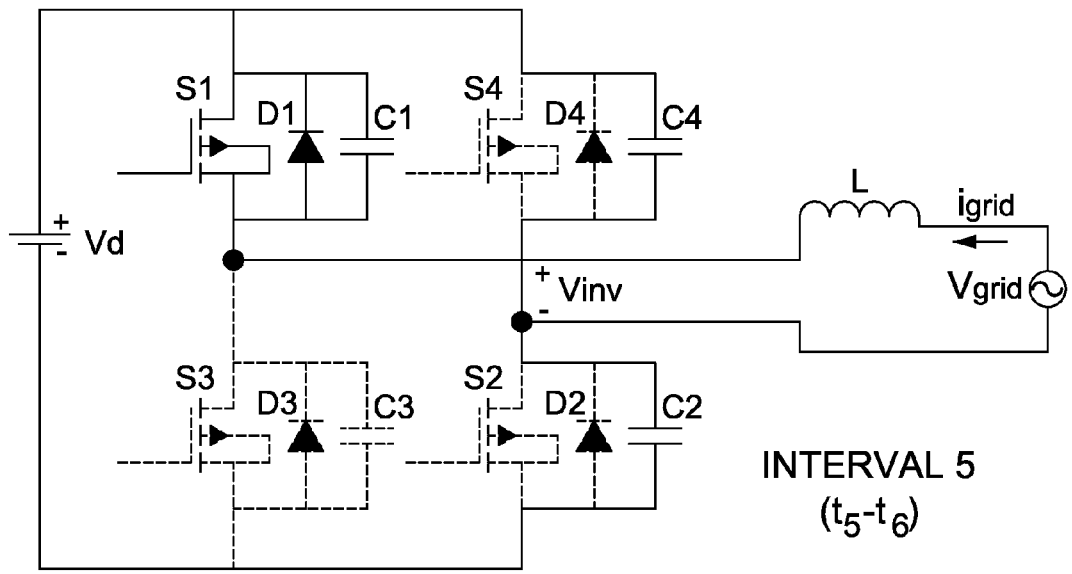
Figure 9G:
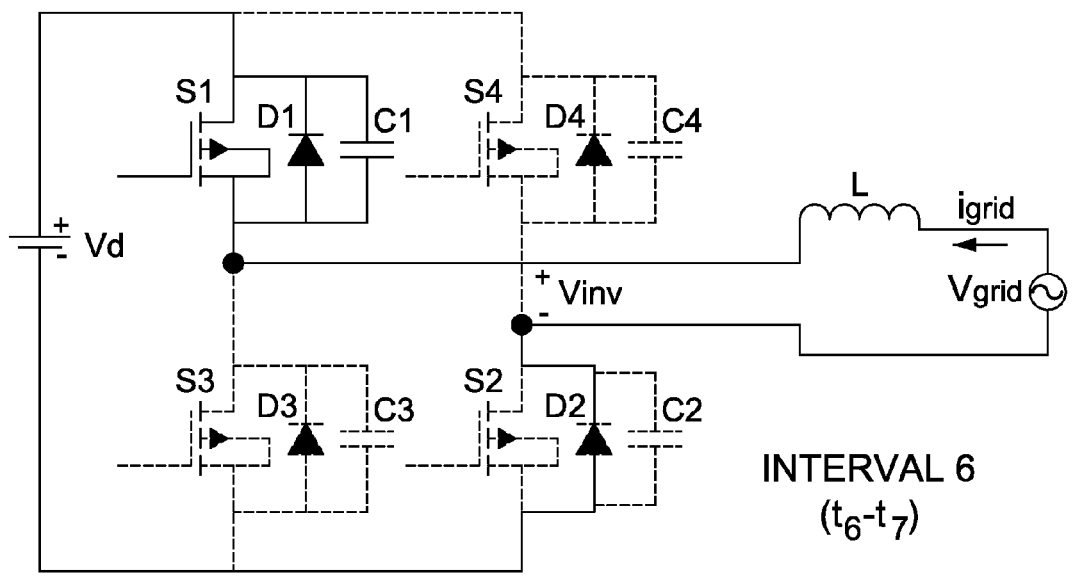
Figure 9H:
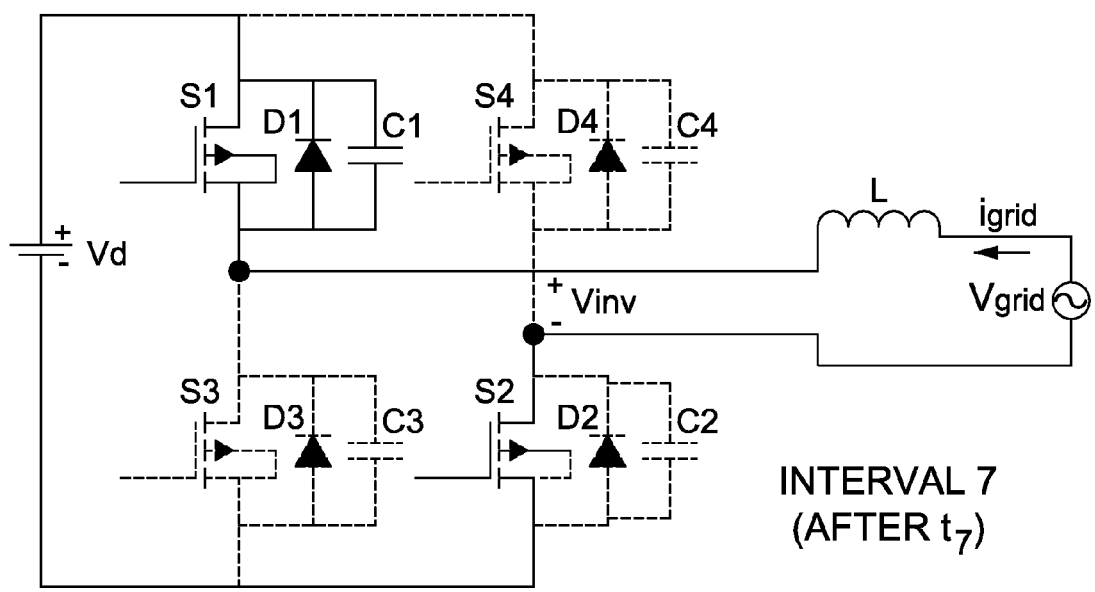

Operation of the inverter is further described with reference to FIGS. 9A-9H. The inverter operation in steady state can be divided into two modes depending upon the polarity of the output voltage $V_{inv}$, i.e., $V_{inv}>0$ or $V_{inv}<0$. The stages of operation for the mode $V_{inv}>0$ are explained below. Equivalent circuits for the circuit operation are illustrated in FIGS. 9B-9H and the corresponding waveforms are shown in FIG. 9A.

Interval 1: (see FIG. 9B) In this stage, $S_1$, $S_2$ are on and $S_3$, $S_4$ are off. The inductor current increases linearly from a negative value to a peak positive value for $t_0<t<t_1$ (the peak-to-peak value is dependent upon the inductance L value). Voltage across the capacitor $C_2$ is 0 while the voltage across the capacitor $C_4$ is $V_d$.

Interval 2: (see FIG. 9C) $S_2$ turns off when the inductor current is a maximum positive value. At this time, the capacitor $C_2$ charges while $C_4$ discharges until the diode $D_4$ is turned on.

Interval 3: (see FIG. 9D) In this interval from $t_2<t<t_3$, the output inductor current circulates in a loop through the freewheeling diode $D_4$ and $S_1$ while $S_2$ remains off. This contributes to zero voltage switching of $S_1$.

Interval 4: (see FIG. 9E) In this stage ($t_3<t<t_5$), switch $S_4$ turns on with ZVS, and the inductor current decreases linearly to its maximum negative value. Since both the upper switches are on, the output inverter voltage as well as the input current is zero.

Interval 5: (see FIG. 9F) $S_4$ turns off. Capacitor $C_4$ charges from zero to $V_d$ which gives ZVS at turn off of $S_4$ and $C_2$ discharges to zero up to the point that $D_2$ is turned on while inductor current changes its direction.

Interval 6: (see FIG. 9G) This is again a freewheeling state, the body diode $D_2$ freewheels the inductor current.

Interval 7: (see FIG. 9H) $S_2$ turns on under zero voltage. Similar to Interval 1, Switches $S_1$ and $S_2$ are now on.

For $V_{inv}<0$, similar operation is followed with the difference that $S_3$ and $S_4$ are on instead of $S_1$ and $S_2$. It is seen that the switches turn on under zero voltage naturally with this mode of conduction.

As shown in FIG. 9A, the dead time $t_{d1}$ and $t_{d2}$ are different and they depend on the current $i_{grid}$ at the time of switching. When the current is lower the dead time should be larger to provide enough time for the capacitors to charge and discharge.

Accordingly, embodiments described herein include variable dead time control to avoid the above-mentioned potential negative effects of a fixed dead time, and to avoid losing soft switching in the event that the snubber capacitor fails to discharge completely. In such embodiments the dead time between the two switches in the same inverter module leg is controlled at different values during an AC cycle. Unlike a DC/DC converter, the turn off current in the switch of a DC/AC inverter varies over the AC cycle. The dead time required to charge the snubber capacitor to the input DC voltage Vd may be calculated by Equation 1. The current $i_{turn-off}$ is the peak value of the grid current at each peak (i.e., each switching cycle), which may be obtained by sampling the current at that peak instant, or by estimation or calculation. Selection of snubber capacitance is based on the worst case value of switch turn off current $i_{turn-off}$ for a fixed dead time.

$$t_{deadtime} = \frac{2C_{snubber}V_d}{i_{turn-off}} \quad (1)$$

Figure 10:
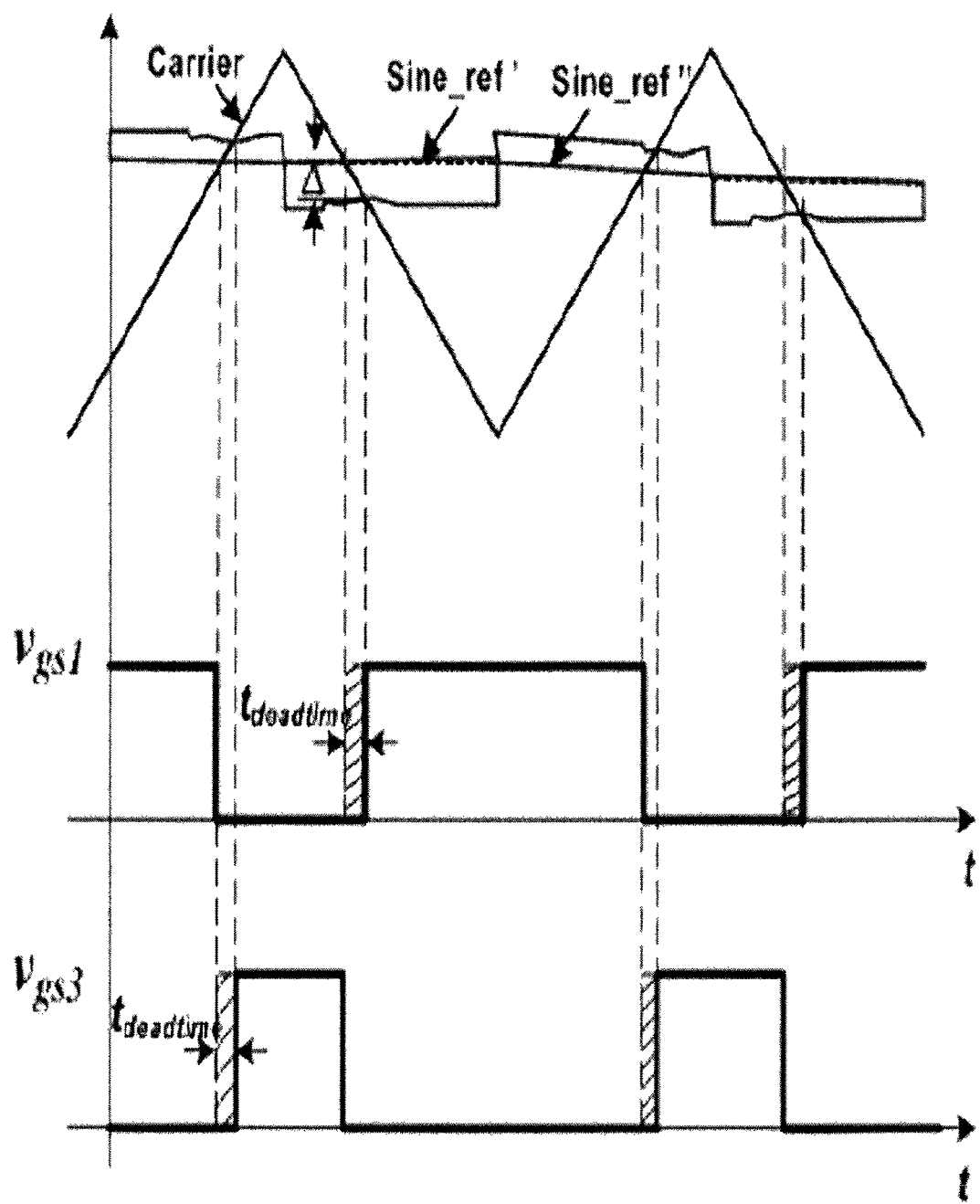
FIG. 10 is a plot showing a dead time generation technique for the leading edge of the gate signals for the switches of a leg of a full bridge inverter module, according to one embodiment.

Total capacitance, $2C_{snubber}$, is the sum of the snubber capacitance in the same full bridge inverter module leg. In embodiments where a more accurate calculation is required, switch (e.g., MOSFET) output capacitances may also be calculated and added to the total capacitance. Since the peak of the current may not be practical or cost effective to measure, the current may be calculated and estimated to implement the variable dead time. The dead band (i.e., the time period that both switches in the same inverter leg are off), as calculated by Equation 1, is inserted prior to the leading edge of the PWM pulses by changing the reference signal by a value Δ. This is illustrated in FIG. 10 where sine_ref'=sine_ref+Δ and sine_ref"=sine_ref−Δ.

The dead band may be determined or estimated using other methods. For example, an estimation technique using a look-up table may be employed for rapid calculation of a precise dead band value. Use of a look-up table facilitates implementation of one or more function, or one or more equation, as may be required, to estimate or calculate the dead band required for any value of output current from zero to maximum. Values determined using a function, or equation, such as, e.g., Equation 1, may be stored in the look-up table, or values may be estimated by other functions or one or more piece-wise linear functions.

Controller

The controller may be implemented in whole or in part using discrete components, using digital technology (e.g., in a digital signal processor (DSP), field programmable gate array (FPGA), or application specific integrated circuit (ASIC) device), or using a combination thereof. For example, one or more components of the controller may be implemented in an algorithm using a suitable hardware language such as, for example, very high speed integrated circuit (VHSIC) hardware descriptive language (VHDL), register transfer language (RTL), or Verilog. Such an algorithm may be implemented in, for example, a FPGA or ASIC device, or other suitable logic device. Use of digital technology provides a controller that is compact and robust.

Figure 11:
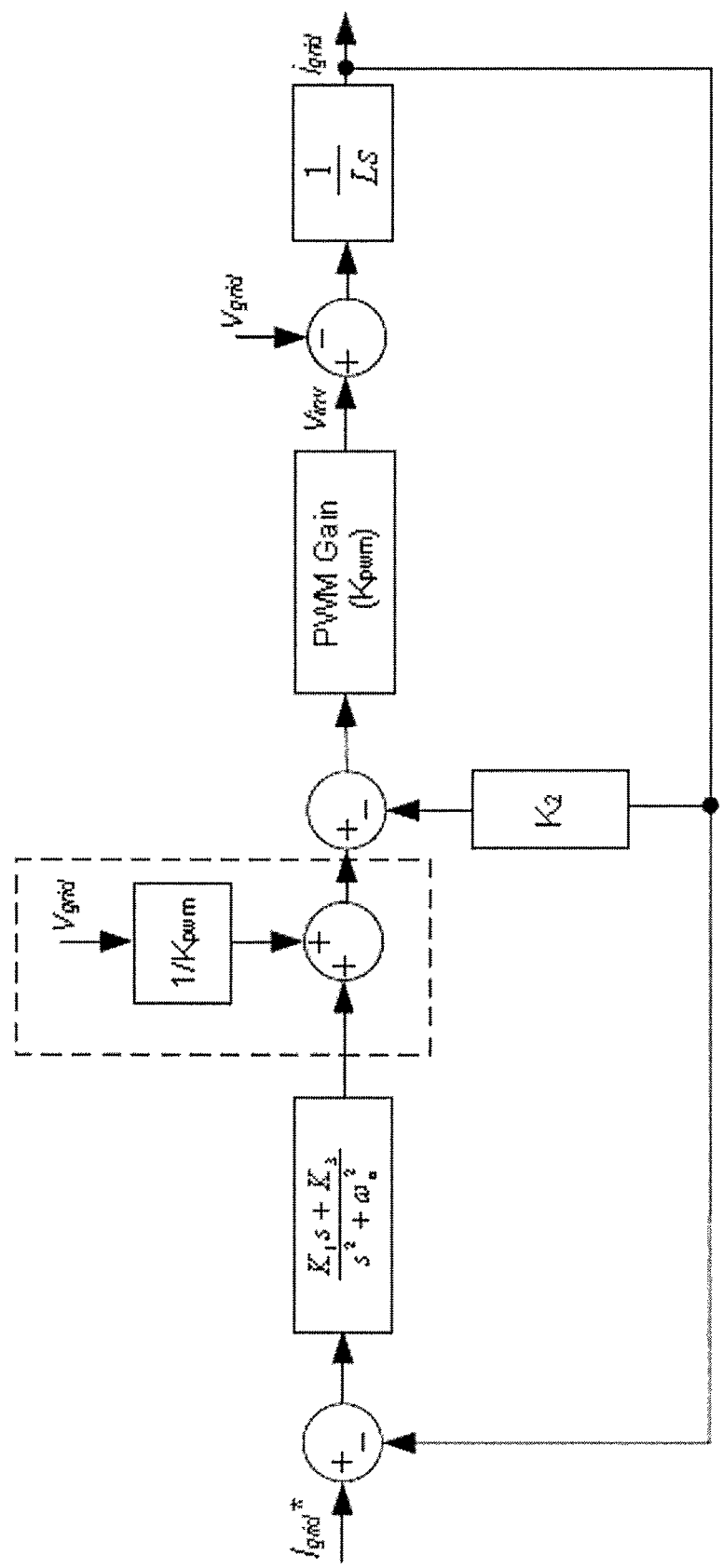
FIG. 11 is a block diagram of a current control loop according to one embodiment.

A current control loop block diagram according to one embodiment is shown in FIG. 11. This embodiment is shown with respect to a grid-connected application, although other applications are contemplated herein. The model employs a state feedback gain $K_2$ and a transfer function for the PR controller. In state feedback, the value of the state vector is fed back to the input of the system. $K_2$ is a constant that is external to the system, and therefore can be modified to adjust the locations of the poles of the system. Assuming the switching frequency is high enough to neglect the inverter dynamics, the PWM inverter, for simplicity of analysis, has been represented by a gain $K_{pwm}$. To mitigate the effect of any instantaneous disturbance from the grid voltage, feed-forward control of the utility grid is applied. The addition of the feed-forward passage in this embodiment is done through a reciprocal of the system inverter bridge gain, that is, $1/K_{pwm}$.

Figure 12:
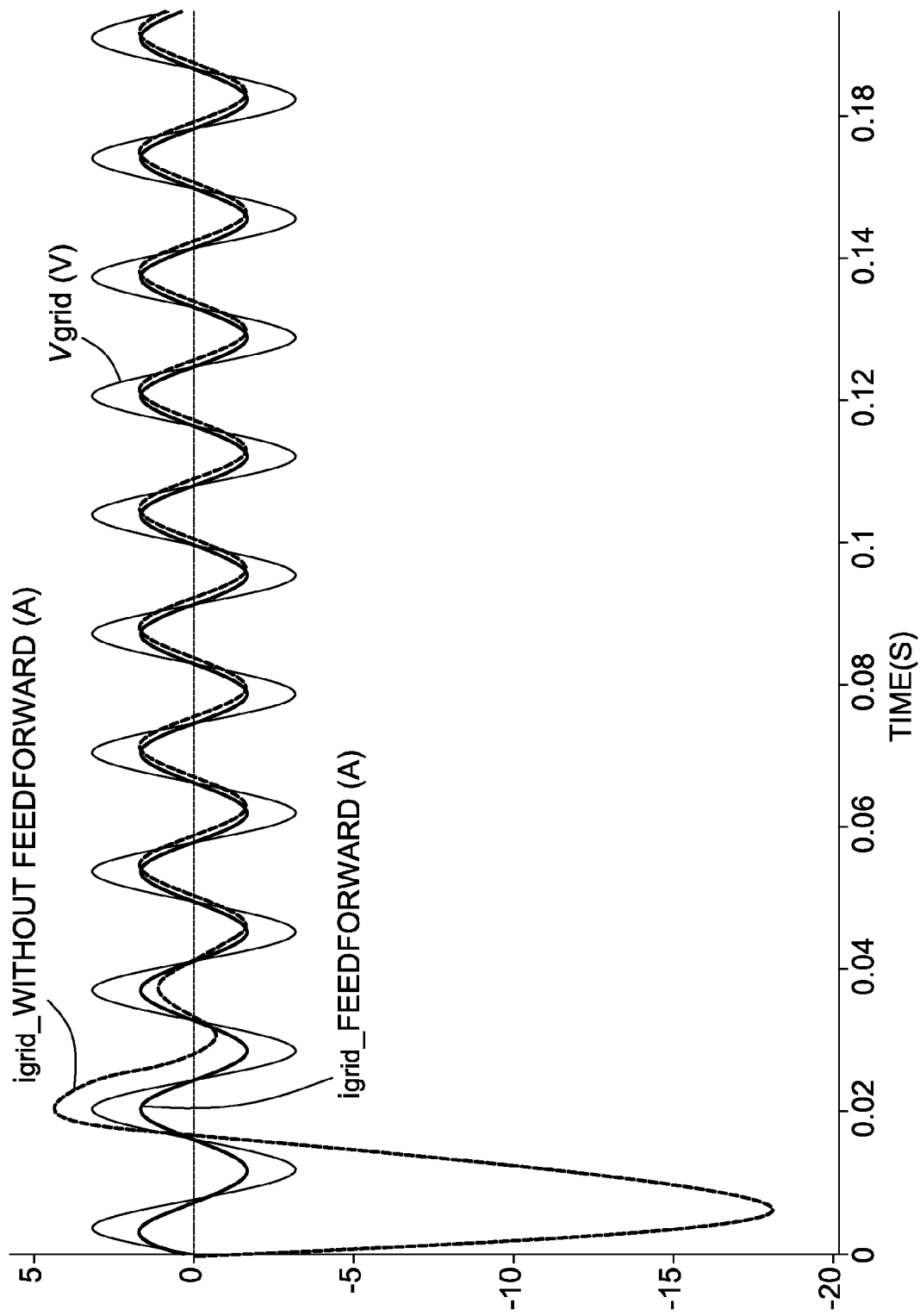
FIG. 12 is a plot of simulation results using the control loop of FIG. 10 showing the effect of the feed forward branch in the control loop structure.

Simulation results presented in FIG. 12 show the effect of introducing the feed forward branch in the control loop structure.

The invention is further described by way of the following non-limiting examples.

Examples

Figure 13:
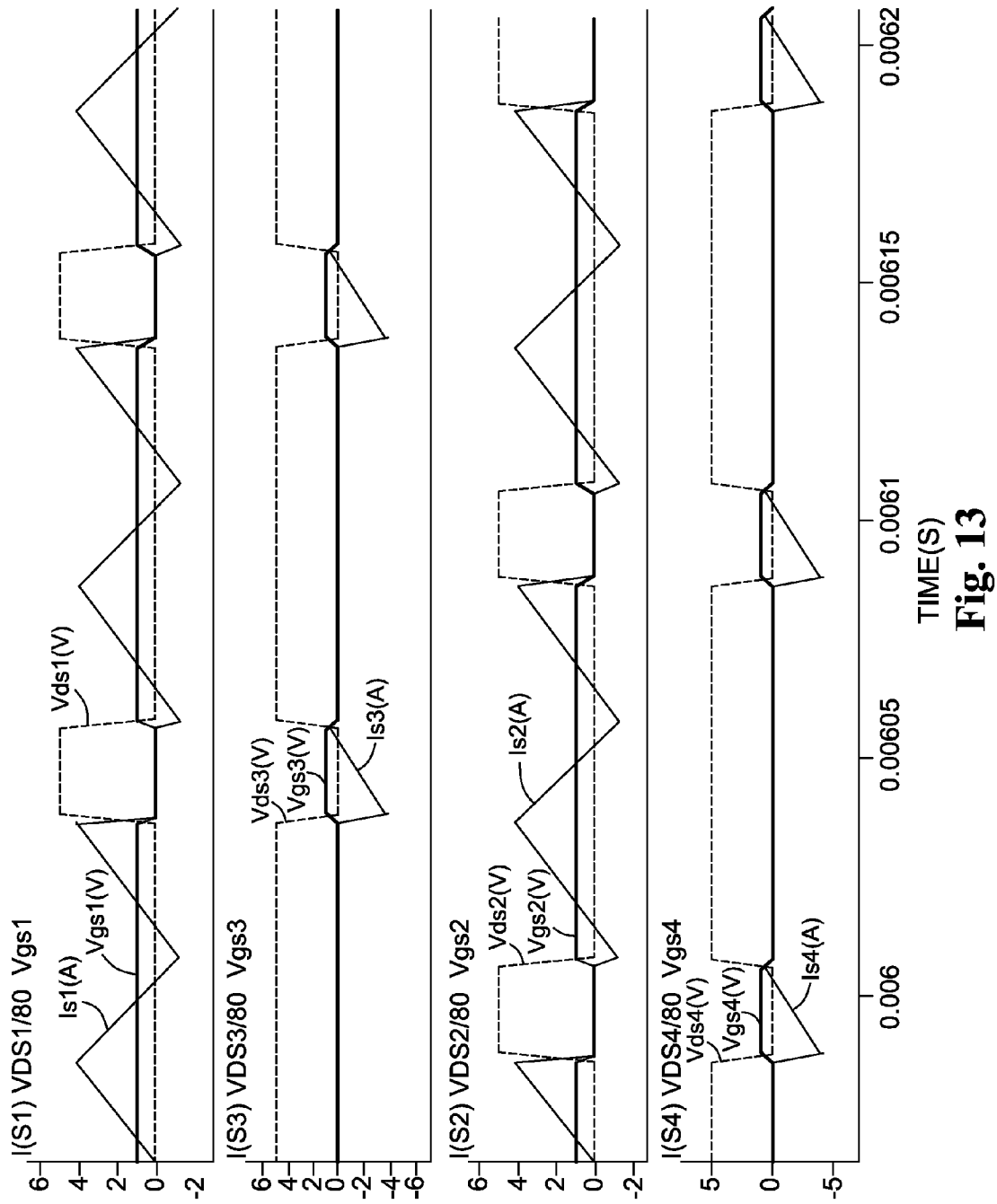
FIG. 13 is a plot showing simulation results for a multiple phase inverter with n=10 full-bridge inverter modules, according to one embodiment, wherein ZVS at switch turn on is shown for the switches S1, S2, S3, S4 (from top to bottom)

A photovoltaic inverter system having n=10 full bridge inverter modules with their outputs connected in parallel, was modeled and simulated in PSIM version 9 (Powersim Inc., Woburn, Mass.). This number of inverter modules was selected to ensure ZVS at every switching period, including the zero crossings of the current (at a line frequency of 60 Hz). The simulation results in FIG. 13 confirm zero voltage switching at turn on of switches S1, S3 (leading leg) and S2, S4 (lagging leg) of the full bridge.

A photovoltaic inverter system having n=10 full bridge inverter modules with their outputs connected in parallel was built in order to validate performance of the phase-staggered inverter and compare the performance with that of the existing soft-switched inverters.

Figure 14A:
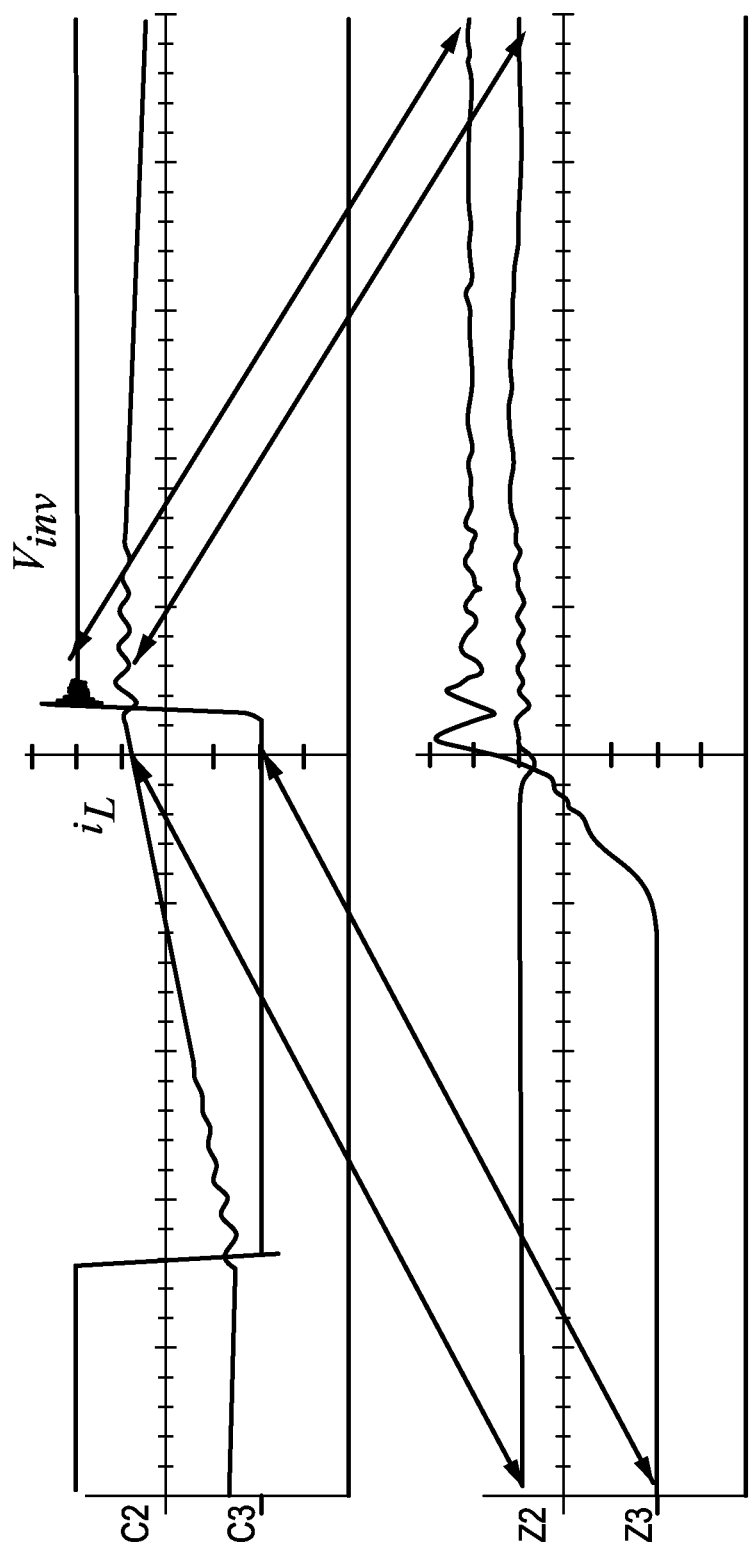
FIGS. 14A-14D are plots showing experimental results for a multiple phase inverter embodiment with n=10 full-bridge inverter modules, for a fixed dead time of 100 ns (FIG. 14A) and for variable dead times of 170 ns, 250 ns, and 700 ns (FIGS. 14B-14D, respectively)
Figure 14B:
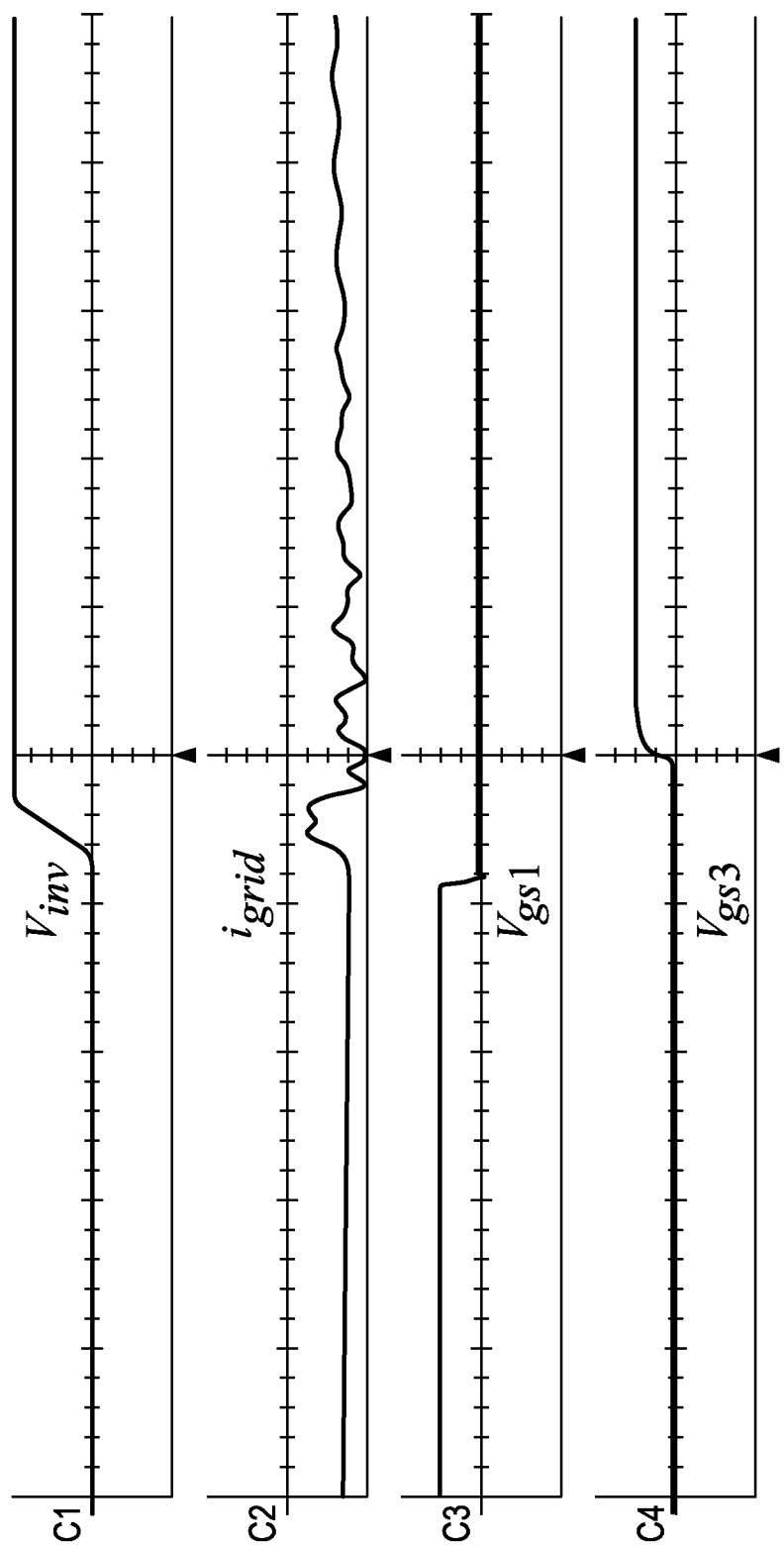
Figure 14C:
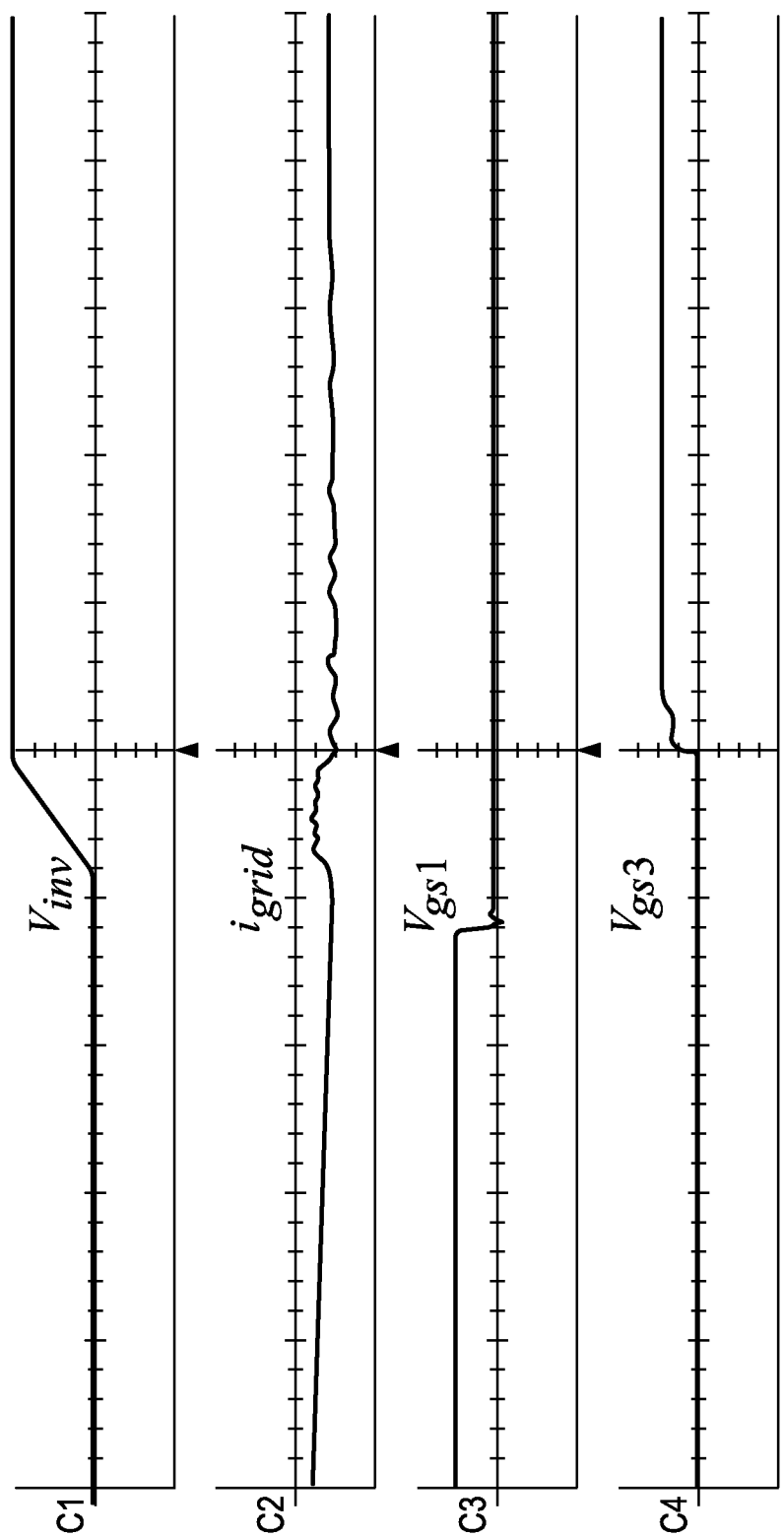
Figure 14D:
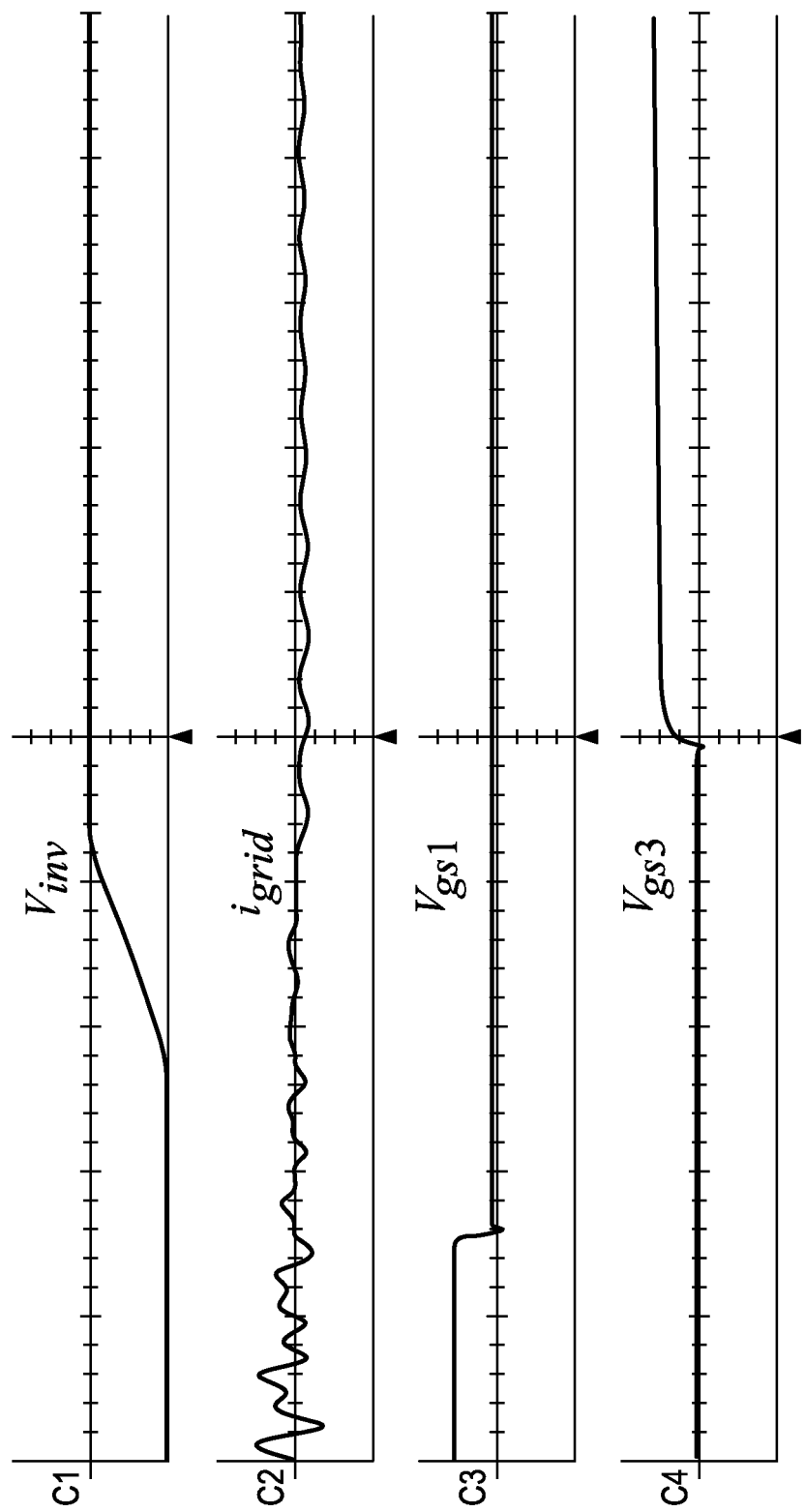
Figure 15:
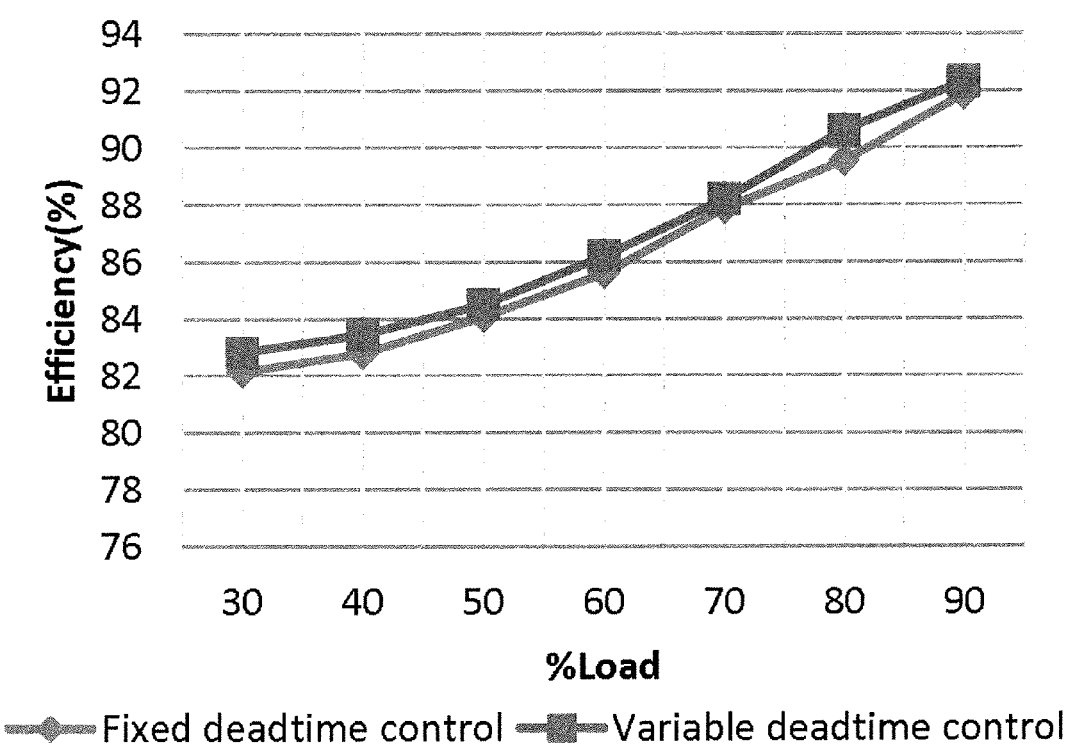
FIG. 15 is a plot comparing efficiency of a multiple phase inverter embodiment under fixed and variable dead time control.

Evaluation of the micro-inverter was carried out using the Verilog hardware description language (VHDL) for FPGAs. An Altera Cyclone IV FPGA (Altera Corporation, San Jose, Calif.) was used for the evaluation. The waveforms for full power are shown for a fixed dead time of 100 ns (FIG. 14A) and for variable dead times of 170 ns, 250 ns, and 700 ns (FIGS. 14B-14D, respectively). The figures show the inverter output voltage and the grid current. From FIG. 14A it can be seen that with the fixed dead time ZVS was not achieved at all points over the ac cycle, even with an optimized value of the fixed dead time. The results for variable dead time control were captured at various points over the ac cycle. From FIGS. 14B-14D it can be seen that ZVS was obtained for different dead time values. A plot comparing efficiency of the inverter with fixed and variable dead time control is shown in FIG. 15. It can be seen that variable dead time control improved efficiency over the measured range of 30% to 90% of full load.

The contents of all references, pending patent applications, and published patents cited throughout this application are hereby expressly incorporated by reference.

Equivalents

Those skilled in the art will recognize or be able to ascertain variants of the embodiments described herein. Such variants are within the scope of the invention and are covered by the appended claims.

The invention claimed is:

1. A DC-AC inverter, comprising:
a voltage source inverter circuit having a DC input and an AC output including a first component at a fundamental frequency and a ripple component at a frequency higher than the fundamental frequency;
a passive element connected to the AC output of the voltage source inverter circuit;
wherein a value of the passive element is selected to maintain the ripple component of the AC output at a sufficient magnitude so that
a voltage source inverter circuit output current reverses polarity and the voltage source inverter circuit operates with zero voltage switching;
wherein the DC-AC inverter includes a cancellation circuit comprising two or more voltage source inverter circuits, each voltage source inverter circuit providing an AC output including a first component at a fundamental frequency and a ripple component at a frequency higher than the fundamental frequency;
wherein each voltage source inverter circuit operates with zero voltage switching;
wherein the AC outputs of each voltage source inverter circuit are connected in parallel to produce a total output current, such that the ripple components of the AC outputs are substantially cancelled to reduce or eliminate the ripple component in the total output current delivered to a load; and
wherein the AC outputs of the voltage source inverter circuits are phase shifted by amounts selected to substantially cancel the ripple components and reduce or eliminate the ripple components in the total output current delivered to the load.

2. The DC-AC inverter of claim 1, further comprising a circuit that reduces or eliminates the ripple component and substantially prevents the ripple component from being delivered to the load;
   wherein the circuit comprises a n-order filter, wherein n is 2 or more; and
   wherein the passive element is an input element of the n-order filter.

3. The DC-AC inverter of claim 2, wherein n is 3.

4. The DC-AC inverter of claim 1, further comprising variable dead time control of switches in the voltage source inverter circuit.

5. The DC-AC inverter of claim 1, wherein the DC input is provided by a renewable energy source.

6. The DC-AC inverter of claim 1, wherein the DC input is provided by a photovoltaic source.

7. The DC-AC inverter of claim 1, wherein the load is a power distribution grid.

8. A photovoltaic module comprising the DC-AC inverter of claim 1.

9. A power generation system, comprising:
   the DC-AC inverter of claim 1 adapted for connection to a load, wherein the load is a power distribution grid; and
   a power generator that provides the DC to the inverter circuit.

10. A DC-AC inverter method, comprising:
    operating a voltage source inverter circuit such that an AC output includes a first component at a fundamental frequency and a ripple component at a frequency higher than the fundamental frequency;
    connecting a passive element to the AC output of the voltage source inverter circuit;
    wherein a value of the passive element is selected to maintain the ripple component of the AC output at a sufficient magnitude so that the voltage source inverter circuit output current reverses polarity and the voltage source inverter circuit operates with zero voltage switching;
    the method further comprising:
    providing two or more voltage source inverter circuits;
    operating each voltage source inverter circuit with zero voltage switching;
    connecting outputs of each voltage source inverter circuit together in parallel to produce a total output current, such that the ripple components of the AC outputs are substantially cancelled to reduce or eliminate the ripple component in the total output current delivered to a load; and
    including phase shifting outputs of the voltage source inverter circuits by amounts selected to substantially cancel the ripple components and reduce or eliminate the ripple component in the to output current delivered to the load.

11. The method claim 10, further comprising using a circuit to reduce or eliminate the ripple component and substantially prevent the ripple component from being delivered to the load;
    wherein the circuit comprises a n-order filter, wherein n is 2 or more; and
    wherein the passive element is an input element of the n-order filter.

12. The method of claim 11, wherein n is 3.

13. The method of claim 10, further comprising using variable dead time control of switches in the voltage source inverter circuit.

14. The method of claim 10, comprising connecting a DC input of the DC-AC inverter to a renewable energy source.

15. The method of claim 10, comprising connecting a DC input of the DC-AC inverter to a photovoltaic source.

16. The method of claim 10, comprising connecting an AC output of the DC-AC inverter to a power distribution grid.

* * * * *